United States Patent
Beaurepaire et al.

(10) Patent No.: US 11,303,621 B2
(45) Date of Patent: Apr. 12, 2022

(54) METHOD AND APPARATUS FOR PAIRING AUTONOMOUS VEHICLES TO SHARE NAVIGATION-BASED CONTENT

(71) Applicant: HERE GLOBAL B.V., Eindhoven (NL)

(72) Inventors: Jerome Beaurepaire, Berlin (DE); Sven Krome, Berlin (DE)

(73) Assignee: HERE Global B.V., Eindhoven (NL)

( * ) Notice: Subject to any disclaimer, the term of this patent is extended or adjusted under 35 U.S.C. 154(b) by 243 days.

(21) Appl. No.: 16/126,866

(22) Filed: Sep. 10, 2018

(65) Prior Publication Data

US 2020/0084193 A1    Mar. 12, 2020

(51) Int. Cl.
*H04L 29/06* (2006.01)
*H04W 4/46* (2018.01)
*G01C 21/34* (2006.01)
*G05D 1/02* (2020.01)

(52) U.S. Cl.
CPC ...... *H04L 63/0492* (2013.01); *G01C 21/3423* (2013.01); *G05D 1/0287* (2013.01); *H04W 4/46* (2018.02)

(58) Field of Classification Search
CPC ..... G06F 16/00; H04L 63/00; H04L 63/0492; H04W 4/00; H04W 4/46; G01C 21/3423; G05D 1/0287
See application file for complete search history.

(56) References Cited

U.S. PATENT DOCUMENTS

| | | | |
|---|---|---|---|
| 8,180,297 B2 | 5/2012 | Hesse et al. | |
| 9,349,234 B2 | 5/2016 | Ricci | |
| 9,371,007 B1* | 6/2016 | Penilla | G06Q 30/0232 |
| 9,628,485 B2 | 4/2017 | Chakraborty et al. | |
| 10,037,689 B2* | 7/2018 | Taylor | G08G 1/096844 |
| 2014/0213280 A1 | 7/2014 | Sandel et al. | |

(Continued)

OTHER PUBLICATIONS

Cooper, "Networked Self-driving Cars Are Smarter and Safer," Oct. 4, 2017, retrieved from https://www.engadget.com/2017/10/04/networked-self-driving-cars-are-smarter-and-safer/, pp. 1-10.

(Continued)

*Primary Examiner* — Joseph P Hirl
*Assistant Examiner* — Leynna Truvan
(74) *Attorney, Agent, or Firm* — Ditthavong, Steiner & Mlotkowski

(57) ABSTRACT

An approach is provided for privacy-sensitive sharing of navigation-based content between vehicles (e.g., autonomous vehicles, drones, devices, etc.). The approach involves initiating a pairing of a first vehicle with at least one second vehicle. The approach also involves determining a privacy level associated with the pairing. The approach further involves determining a granularity level for sharing the navigation-based content of the first vehicle with the at least one second vehicle based on the privacy level. The approach further involves granting an access right to the at least one second vehicle to access the navigation-based content at the determined granularity level. The at least one second vehicle is then guided based on the navigation-based content of the first vehicle at the determined granularity level.

20 Claims, 18 Drawing Sheets

(56) References Cited

U.S. PATENT DOCUMENTS

| | | | |
|---|---|---|---|
| 2014/0223283 A1* | 8/2014 | Hancock | H04W 4/029 |
| | | | 715/234 |
| 2014/0306814 A1 | 10/2014 | Ricci | |
| 2015/0298654 A1* | 10/2015 | Joao | G01S 19/13 |
| | | | 701/2 |
| 2016/0071418 A1 | 3/2016 | Oshida et al. | |
| 2017/0215031 A1* | 7/2017 | Harding | G01C 21/3697 |
| 2017/0370731 A1 | 12/2017 | Bresnahan et al. | |
| 2020/0305167 A1* | 9/2020 | Freda | H04W 72/0446 |

OTHER PUBLICATIONS

Office Action for the related European Patent Application No. 19195601.0-1001/3628975, dated Jun. 26, 2020.

* cited by examiner

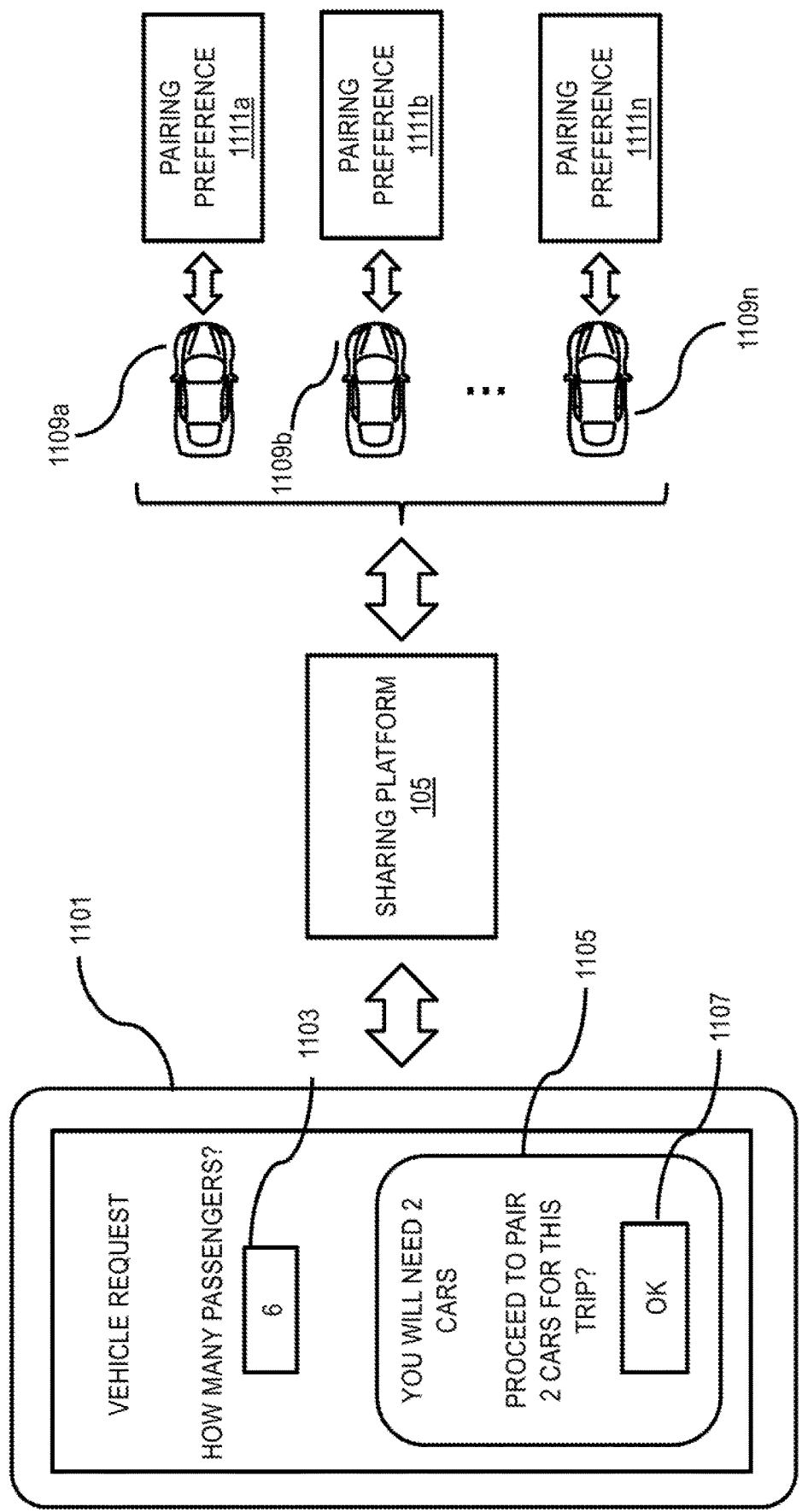

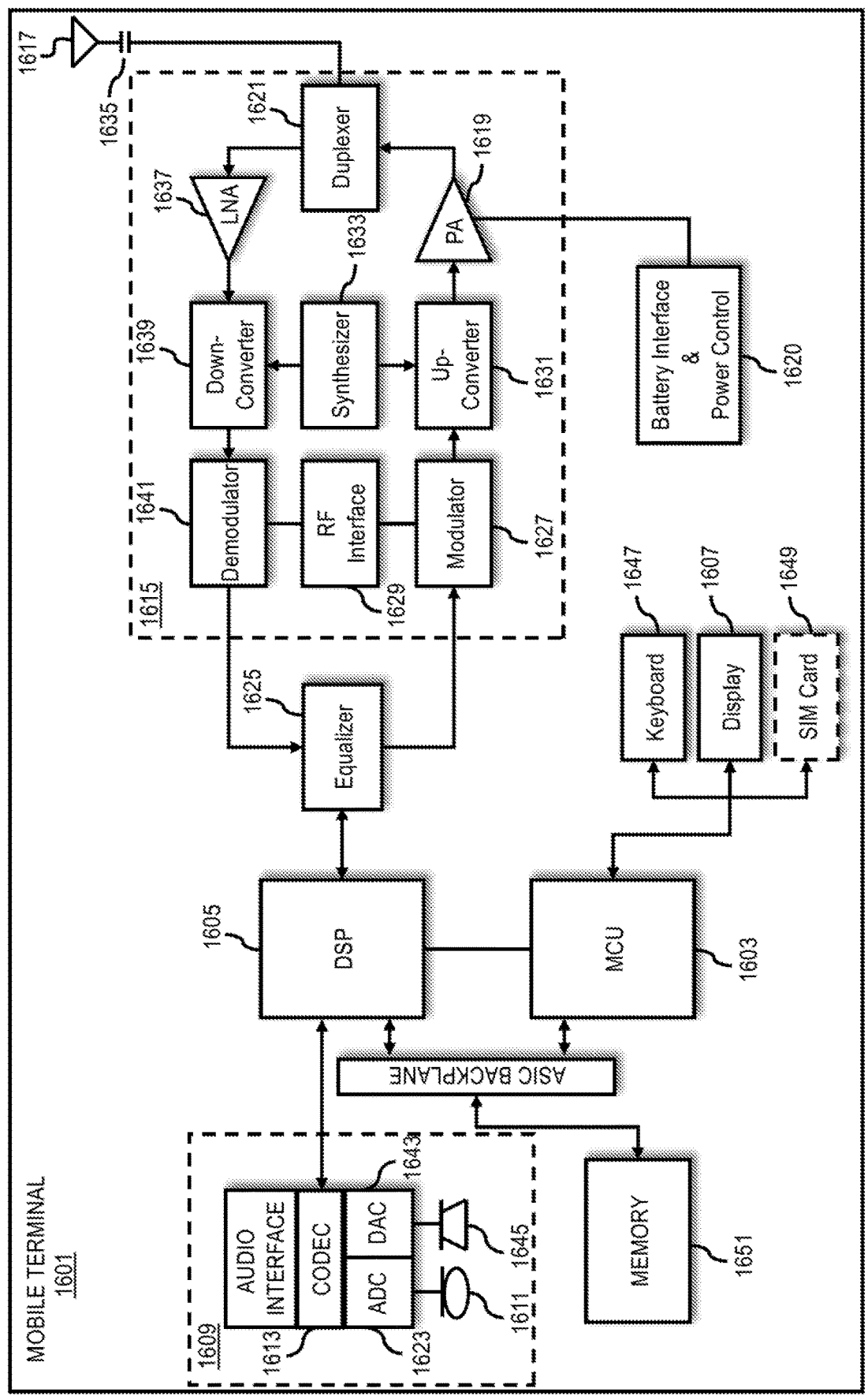

METHOD AND APPARATUS FOR PAIRING AUTONOMOUS VEHICLES TO SHARE NAVIGATION-BASED CONTENT

BACKGROUND

The use of autonomous or highly-assisted vehicles (HAD) vehicles for ride-sharing and other transportation-related services is growing in availability and popularity. Typically, autonomous or HAD vehicles are equipped with sophisticated navigation and communication systems to provide for safe operations. One area of development has been in leveraging the systems in autonomous vehicles and other advanced vehicles to provide improved user experiences. However, users who request or require multiple vehicles to complete a ride-sharing trip (e.g., because of many passengers, cargo, etc.) can pose significant technical challenges to coordinating the sharing of trip information or other navigation-based content (e.g., destinations, vehicle locations, etc.) to ensure that the vehicles can complete a trip together while also preserving the privacy of the users or passengers.

SOME EXAMPLE EMBODIMENTS

Therefore, there is need for an approach for pairing vehicles (e.g., autonomous cars or any other mobile autonomous device) to share navigation-based content (e.g., destination and/or location information).

According to one embodiment, a computer-implemented method for privacy-sensitive sharing of navigation-based content between a first vehicle and at least one second vehicle comprises initiating a pairing of the first vehicle with the at least one second vehicle. The method also comprises determining a privacy level associated with the pairing. The method further comprises determining a granularity level for sharing the navigation-based content of the first vehicle with the at least one second vehicle based on the privacy level. The method further comprises granting an access right to the at least one second vehicle to access the navigation-based content at the determined granularity level. The at least one second vehicle is then guided based on the navigation-based content of the first vehicle at the determined granularity level.

According to another embodiment, an apparatus comprises at least one processor, and at least one memory including computer program code for one or more programs, the at least one memory and the computer program code configured to, with the at least one processor, to cause, at least in part, the apparatus to initiate a pairing of a first vehicle with at least one second vehicle. The apparatus is also caused to grant an access right to the at least one second vehicle to access destination information, location information or a combination thereof of the first vehicle based on the pairing. For example, the destination information, the location information, or a combination thereof relates to a trip. The apparatus is further caused to revoke the access right based on determining that the at least one second vehicle has completed the trip.

According to another embodiment, a non-transitory computer-readable storage medium carrying one or more sequences of one or more instructions which, when executed by one or more processors, cause, at least in part, an apparatus to initiate a pairing of a first vehicle with at least one second vehicle. The apparatus is also caused to grant an access right to the at least one second vehicle to access destination information, location information or a combination thereof of the first vehicle based on the pairing. For example, destination information, the location information, or a combination thereof relates to a trip. The apparatus is further caused to revoke the access right based on determining that the at least one second vehicle has completed the trip.

According to another embodiment, an apparatus comprises means for initiating a pairing of a first vehicle with at least one second vehicle. The apparatus also comprises means for granting an access right to the at least one second vehicle to access destination information, location information or a combination thereof of the first vehicle based on the pairing. For example, the destination information, the location information, or a combination thereof relates to a trip. The apparatus further comprises means for revoking the access right based on determining that the at least one second vehicle has completed the trip.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device or other client device (e.g., an autonomous vehicle system) with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 11 is a diagram of an example user interface for generating a vehicle request to initiate sharing of navigation-based content between vehicles, according to one embodiment;

FIG. 16 is a diagram of a terminal that can be used to implement an embodiment.

DESCRIPTION OF SOME EMBODIMENTS

Examples of a method, apparatus, and computer program for pairing autonomous or HAD vehicles to share navigation-based content (e.g., destination information and/or location information) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to an autonomous vehicle, it is contemplated that the approaches of the various embodiments described herein are applicable to highly-assisted driving (HAD) vehicles as well as to manually driven vehicles. Moreover, although the vehicles are generally described as automobiles (e.g., autonomous and non-autonomous), it is contemplated that the approaches of the various embodiments described herein are applicable to any vehicle, means of transport, or transport-capable device (e.g., buses, trains, planes, boats, drones, bikes, electric bikes (e-bikes), electric scooters (e-scooters), carts, rollers, etc.).

Figure 1:
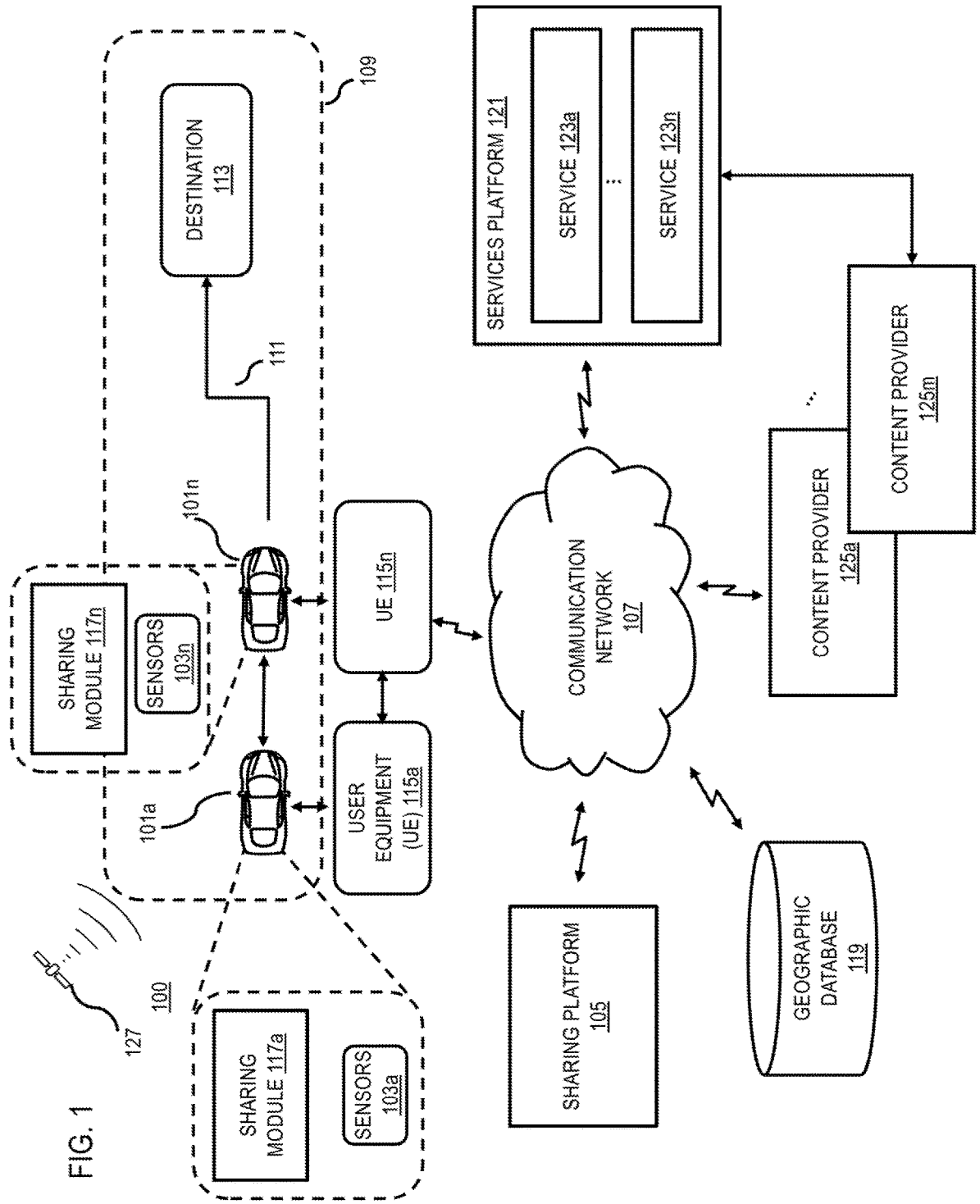
FIG. 1 is a diagram of a system capable of pairing vehicles to share navigation-based content, according to one embodiment.

FIG. 1 is a diagram of a system capable of pairing vehicles (e.g., autonomous or HAD vehicles) to share navigation-based content (e.g., destination information and/or location information), according to one embodiment. As noted above, an autonomous vehicle can drive itself without the input of vehicle passengers or occupants, providing a variety of use cases including but not limited to taxi services, on-demand ride-sharing, carpooling, and/or the like. However, in some instances of these services, more than one vehicle is required to transport a group of passengers. For example, in a typical scenario, a large group of colleagues (e.g., 10) may be on a business trip and want to go to a restaurant after work. To accommodate 10 passengers, the group orders two vehicles (e.g., autonomous Car 1 and Car 2) to travel to the restaurant. However, once the cars arrive, problems can arise with coordinating the travel destination of the two vehicles. For example, once in Car 1, one of the passengers (e.g., Joe) indicates the destination to autonomous Car 1, but Car 2 does not have access to this destination. Traditionally, Joe would have to communicate the destination to one of his colleagues (e.g., Mike) riding in Car 2 via traditional communication means (e.g., by phone, text messaging, email, etc.), but this option can be cumbersome in such context (e.g., Mike may not speak the local language and cannot communicate with Car 2 and/or its operator). Another traditional solution would be to use a "send to car" feature of a navigation system or a mobile device; however, this is a very static solution and cannot handle situations where different routes and/or destinations are taken after the initial destination is sent. Under either traditional approach, users are generally required to take some action to coordinate the travel between the two cars, thereby providing a reduced user experience. Hence, service providers face significant technical challenges to coordinate group travel split among multiple vehicles including but not limited to challenges with efficiently exchanging data between users, mobile devices, and cars in a privacy sensitive manner.

To address this problem, the system 100 of FIG. 1 introduces a capability to pair vehicles (e.g., autonomous or HAD vehicles) to share navigation-based content (e.g., destinations, vehicle locations, routes, etc.) to ensure that the vehicles can complete the trip together while also preserving the privacy of the users or passengers. The system 100, for instance, could pair a first vehicle (e.g., Car 1 or vehicle 101a) and a second vehicle (e.g., Car 2 or vehicle 101n)

using one of several vehicle pairing mechanisms such as direct vehicle-to-vehicle (V2V) communication with authentication mechanisms or mobile to mobile access rights granting, then pairing the vehicle (e.g., Car 2). Following the example of Joe and Mike described above, Mike in Car 2 asks Joe in Car 1 through a mobile application (e.g., a messaging application executing on user equipment (UE) 115a-115n) for the right to follow Joe in Car 1. In one embodiment, Car 1 can visually indicate to Mike in Car 2 that the request to follow Car 1 has been received by the user (e.g., Joe) and/or Car 1 (e.g., through a UE 115 such as a vehicle navigation display or a mobile device). By way of example, the system 100 could visually indicate the receipt by causing a light/warning indicator of Car 1 to blink once, changing the color of a light emitting diode (LED) associated with Car 1 from red to yellow, etc. In this instance, Joe accepts Mike's request while his phone (e.g., UE 115a) is paired with Car 1, which grants Mike's phone (e.g., UE 115n) paired to Car 2 access to Car 1. Thus, Mike and Car 2 now know Car 1's destination, location, and/or other navigation-based content. Consequently, Car 2 can properly follow Car 1 and will not lose it in traffic or through a series of complicated turns, for example. In one instance, the Joe's acceptance can make sure that Car 1 arrives at the destination (e.g., the restaurant) first so that Joe can take care of his guests and welcome everyone in the proper place. By way of example, to ensure that Car 2 arrives after Car 1, the system 100 can route Car 2 so that Car 2 is always behind Car 1 by a set amount of time, provide Car 2 an intermediate destination before the final destination, provide Car 2 a longer route to the destination relative to the route taken by Car 1, and/or take any other similar action to achieve the requested arrival order of the cars.

In one embodiment, the system 100 can pair a first vehicle (e.g., vehicle 101a) with more than one other vehicle. For example, while carpooling is often advantageous (e.g., save gas, ease of logistics, etc.); sometimes it makes more sense for users to take their own vehicles from a starting point (e.g., work) to a destination (e.g., a restaurant). This may case where a user lives closer to the destination than they do from the starting point. Following the example of Joe and Mike described above, in one instance many more colleagues other than just Mike (e.g., Cheryl, Dave, Edward, and Francois) may want to follow Joe to the restaurant. In the situation described above, each user would need to separately ask Joe in Car 1 for the right to follow Car 1. Then, Joe would need to individually respond and/or accept each user's request. In situations where the number of requesting users is greater than two or three, this can reduce the user's experience and may be burdensome. Thus, in one embodiment, a user (e.g., Joe) can designate a geofenced area (e.g., an office building, parking lot, etc.) within which the system 100 will grant access to all users making a request to follow her/him within the given area to be sure that all colleagues can follow the car (e.g., vehicle 101a) to the destination.

In some instances, the system 100 may need to employ a series of fallback and propagation mechanisms (i.e., "passing the rights" from one use to another user). For example, in one instance, a user in a first autonomous or HAD vehicle (e.g., Joe) may not be able to reply to a request for rights (e.g., the user does not hear or feel their mobile device and the device is not yet paired with the vehicle). In one embodiment, the system 100 can determine another person in that same car to also transmit a pairing request. In one instance, the system 100 may determine the other person based on a ranking or a priority of order. For example, the user entering the destination may be asked first, a spouse next, and kids in the vehicle at the end, if at all, depending on their age. The system 100 may know, in one instance, who is in the car based on the destination (e.g., a school), access to a calendar application or a social media feed, an input from one or more users in the car, etc. and the user may have previously designated the priority of order or the system 100 may determine that if a pairing request had been previously been set to another user (e.g., a spouse), she or he may still have the right to grant a pairing request. This assumes, of course, that the past grant of access was not a one off or an emergency grant of access. In another instance, a third autonomous or HAD vehicle (e.g., Car 3) may ask Car 2 for the right to follow it. In this example, Car 1 can be configured so that the rights given to Car 2 can be shared with other vehicles (e.g., Car 3) by default or not (i.e., requiring a new validation by Car 1). In one embodiment, in the example where Car 1 is configured such that the rights given to Car 2 can be shared with other vehicles by default, the access right granting user (e.g., Joe) can set a maximum number of permitted "followers" (e.g., 2-3 vehicles) that Car 2 may share by default the rights given to it by Car 1. For example, Joe may know that the available parking at the destination is limited and, therefore, granting rights to more than 2-3 vehicles may not lead to a positive user experience.

In one embodiment, the system 100 can enable a user who wants to follow a car (e.g., Car 1) to ask to retrieve the destination from the vehicle whose plate is "1234 XY 789." It is contemplated that the user may make the request through one or more inputs (e.g., entering the plate number through the keypad of a mobile device, using one or more voice commands (e.g., "vehicle 1234 XY 789 destination"), using a mobile device (e.g., a phone) to capture a photograph of the plate, etc. In one instance, the system 100 can determine to make the destination of an autonomous or HAD vehicle (e.g., a city bus) public. In contrast, in the context of a private autonomous or HAD vehicle (e.g., a private car), the system 100 would require that the user or passenger of a second vehicle (e.g., Car 2) contact the devices paired/associated with Car 1 (e.g., Joe's mobile device) for the right to be followed. As previously mentioned, it is contemplated that the system 100 can rank by priority the order of users that can grant a second vehicle (e.g., Car 2) the right to follow the first vehicle (e.g., Car 1).

In one embodiment, the system 100 may vary the access rights granted to a second user (e.g., Mike), a second vehicle (e.g., Car 2), or a combination thereof based on one or more privacy concerns. For example, the system 100 can share the destination of Car 1 (e.g., a restaurant) and/or the real-time position of Car 1 (e.g., between the conference center and the restaurant) with Car 2 until Car 2 reaches the intended destination. In an example, where the two cars are returning to different locations, the system 100 may require the user or passenger of Car 2 to request a new access to follow Car 1 again. Alternatively, the system 100 may enable Car 2 to have access throughout a journey (e.g., where Car 1 and Car 2 are both leaving a starting location, traveling to a destination, and then returning to the same starting location). In another example, the system 100 may only share the destination of Car 1 with Car 2 (i.e., not share the real-time location of Car 1). For example, Car 1 may need to make one or more stops along the way to the restaurant that are of no consequence to Car 2 or the user or passenger of Car 1 may not want the users or passengers of Car 2 to know where or what stops she or he has made along the way (e.g., picking up a cake for a surprise birthday). The system 100, in one instance, may share Car 1's destination with Car 2, but not the precise location for privacy reasons. Likewise, it is contemplated that the system 100 may share Car' 1 destination with Car 2, but not provide the exact route that Car 1 is traveling. For example, in the case of a combat zone, the system 100 may share a different route so that both vehicles are not traveling the same route to a destination (e.g., an army base).

The system 100's ability to pair vehicles (e.g., autonomous or HAD vehicles) to share navigation-based content (e.g., destinations, vehicle locations, etc.) may be advantageous in a number of group settings or scenarios such as large family trips (e.g., a family reunion or a wedding); sporting events (e.g., a team traveling between a hotel and a stadium or practice facility); groups of individuals attending a live event (e.g., a sports match, a concert, etc.). Further, the system 100's ability to pair vehicles to share navigation-based content is also advantageous for users traveling in a foreign country where users or passengers are not familiar with the local language, the alphabet, or a combination thereof.

As shown in FIG. 1, the system 100 comprises one or more vehicles 101*a*-101*n* (also collectively referred to herein as vehicles 101) configured with one or more sensors 103*a*-103*n* (also collectively referred to herein as sensors 103). In one embodiment, the vehicles 101 have connectivity to a sharing platform 105 via a communication network 107. In one embodiment, the vehicles 101 are vehicles (autonomous, HAD, or manually driven) that can sense their environments and navigate within a travel network 109 including one or more routes 111 and one or more destinations 113. In one embodiment, the vehicles 101 also have connectivity to one or more user equipment (UE) 115*a*-115*n* (also collectively referred to herein as UEs 115) having connectivity to the sharing platform 105 via the communication network 107. In one embodiment, the sharing platform 105 may be a cloud-based platform that collects and processes pairing data (e.g., a paring request from a vehicle 101, a UE 115, or a combination thereof), privacy settings (e.g., public or private access, a precise or a general location of a vehicle 101, etc.), navigation-based content (e.g., a destination, a location, or a combination thereof of a vehicle 101), or a combination thereof. In addition or alternatively, the sharing platform 105 can collect pairing data, navigation-based content, or a combination thereof from one or more sharing modules 117*a*-117*n* (also collectively referred to herein as sharing modules 117) associated with the vehicles 101, and may also have connectivity with the sharing modules 117 via the communication network 107. Although the vehicles 101 are depicted as automobiles, it is contemplated that the vehicles 101 may be any vehicle or transport-capable device (e.g., buses, trains, planes, boats, drones, etc.). In one embodiment, the sensors 103 (e.g., camera sensors, light sensors, Lidar sensors, Radar, infrared sensors, thermal sensors, and the like) acquire navigation-based data during an operation of the vehicle 101 along the one or more routes 111. By of example, the navigation-based data may include mapping or route information, vehicle-to-everything (V2X) information such as vehicle (V2V) communications, vehicle-to-infrastructure (V2I) communications, etc.

In one embodiment, the UEs 115 can be associated with any of the vehicles 101 or a user or a passenger of a vehicle 101. By way of example, the UE 115 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 115 can support any type of interface to the user (such as "wearable" circuitry, etc.). In one embodiment, the vehicles 101 may have cellular or wireless fidelity (Wi-Fi) connection either through the inbuilt communication equipment, the UEs 115, or the sharing module 117 associated with the vehicles 101. Also, the UEs 115 may be configured to access the communication network 107 by way of any known or still developing communication protocols. In one embodiment, the UEs 115 may include one or more applications (e.g., a messaging application) to send or receive a pairing request, personal user data (e.g., a user identity), anonymized user data (e.g., a user age), or a combination thereof.

In one embodiment, the sharing platform 105 performs the process for pairing vehicles to share navigation-based content as discussed with respect to the various embodiments described herein. In one embodiment, the sharing platform 105 can be a standalone server or a component of another device with connectivity to the communication network 107. For example, the component can be part of an edge computing network where remote computing devices (not shown) are installed along or within proximity of the travel network 109. In one embodiment, the sharing platform 105 has connectivity over the communication network 107 to the services platform 121 (e.g., an OEM platform) that provides one or more services 123*a*-123*n* (also collectively referred to herein as services 123) (e.g., sensor data collection services). By way of example, the services 123 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the sharing module 117 performs the functions of the sharing platform 105 through non-networked-connected technology (i.e., not sharing location relevant data to servers using one or more sensors 103 (e.g., a camera).

In one embodiment, content providers 125*a*-125*n* (also collectively referred to herein as content providers 123) may provide content or data (e.g., navigation-based content such as destination information, routing instructions, point of interest (POI) data, historical data, etc.) to the vehicles 101, the sharing platform 105, the sharing module 117, the geographic database 119, the services platform 121, the services 123, and the vehicles 101. The content provided may be any type of content, such as map content, contextual content, audio content, video content, image content, etc. In one embodiment, the content providers 125 may also store content associated with the vehicles 101, the sharing platform 105, the sharing module 117, the geographic database 119, the services platform 121, and/or the services 123. In another embodiment, the content providers 125 may manage access to a central repository of data, and offer a consistent, standard interface to data, such as a repository of the geographic database 119.

By way of example, as previously stated the sensors 103 may be any type of sensor. In certain embodiments, the sensors 103 may include, for example, a global positioning sensor (GPS) for gathering location data, a network detection sensor for detecting wireless signals or receivers for different short-range communications (e.g., Bluetooth, Wi-Fi, light fidelity (Li-Fi), near field communication (NFC) etc.), temporal information sensors, a camera/imaging sensor for gathering image data (e.g., for detecting a license plate of a vehicle 101), velocity sensors, and the like. In one embodiment, the sensors 103 can detect a user or passenger and/or a UE 115 within a vehicle 101. In another embodiment, the sensors 103 may include sensors (e.g., mounted along a perimeter of the vehicle 101) to detect the relative distance of the vehicle from lanes or roadways, the presence of other vehicles 101, pedestrians, animals, traffic lights, road features (e.g., curves) and any other objects, or a combination thereof. In one scenario, the sensors 103 may detect weather data, traffic information, or a combination thereof. In one example embodiment, the vehicles 101 may include GPS receivers to obtain geographic coordinates from satellites 127 for determining current or live location and time. Further, the location can be determined by a triangulation system such as A-GPS, Cell of Origin, or other location extrapolation technologies when cellular or network signals are available. In another example embodiment, the services 123 may provide in-vehicle navigation services.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the sharing platform 105 may be a platform with multiple interconnected components. By way of example, the sharing platform 105 may include multiple servers, intelligent networking devices, computing devices, components and corresponding software for determining future events for one or more locations based, at least in part, on signage information. In addition, it is noted that the sharing platform 105 may be a separate entity of the system 100, a part of the services platform 121, the one or more services 123, or the content providers 125. In one embodiment, the sharing platform 105 and the sharing module 117 can perform the same tasks or functions, except, in some instances, that the sharing platform 105 can enable navigation-based content to be shared using a network-connected technology (e.g., the communication network 107) and the sharing module 117 can enable navigation-based content to be shared using non-networked technology (e.g., a camera).

In one embodiment, the geographic database 119 stores information regarding on one or more routes 111 or road links (e.g., road length, road breadth, slope information, curvature information, etc.) and probe data for the one or routes 113 (e.g., traffic density information) within the travel network 109. The information may be any of multiple types of information that can provide means for sharing navigation-based content. In another embodiment, the geographic database 119 may be in a cloud and/or in a vehicle 101, a mobile device (e.g., a UE 115), or a combination thereof.

By way of example, the vehicles 101, the sharing platform 105, the UEs 115, the sharing module 117, the geographic database 119, the services platform 121, the services 123, and the content providers 125 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
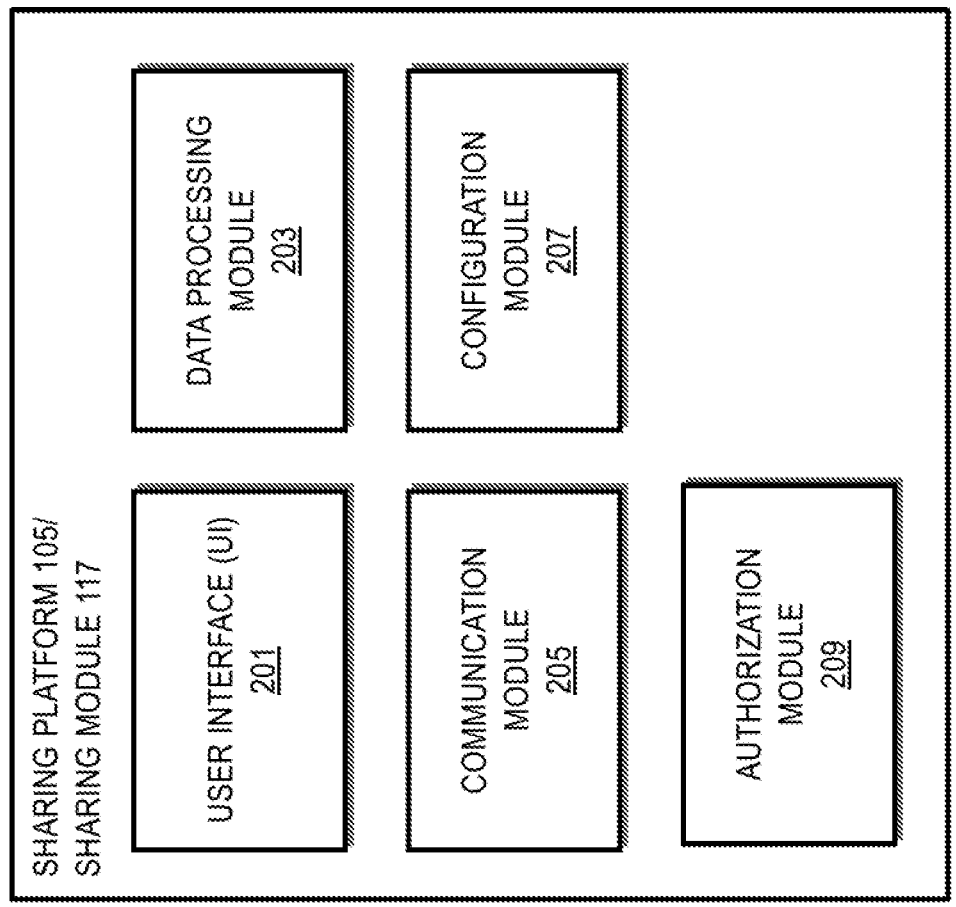
FIG. 2 is a diagram of the components of a sharing platform, according to one embodiment.

FIG. 2 is a diagram of the components of the sharing platform 105, according to one embodiment. In one embodiment, the sharing module 117 of the vehicle 101 can perform all or a portion of the functions of the sharing platform 105 alone or more in combination with the sharing platform 105. By way of example, the sharing platform 105 and/or sharing module 117 include one or more components for collecting and processing pairing data (e.g., a paring request from a vehicle 101, a UE 115, or a combination thereof), privacy settings (e.g., public or private access, a precise or a general location of a vehicle 101, etc.), navigation-based content (e.g., a destination, a location, or a combination thereof of a vehicle 101), or a combination thereof. It is contemplated that the functions of these components may be combined or performed by other components of equivalent functionality.

In this embodiment, the sharing platform 105 and/or sharing module 117 include a user interface (UI) module 201, a data processing module 203, a communication module 205, a configuration module 207, and an authorization module 209. The above presented modules and components of the sharing platform 105 and/or sharing module 117 can be implemented in hardware, firmware, software, or a combination thereof. Though depicted as separate entities in FIG. 1, it is contemplated that the sharing platform 105 and/or sharing module 117 may be implemented as a module of any of the components of the system 100 (e.g., a component of the vehicles 101, services platform 121, services 123, etc.). In another embodiment, one or more of the modules 201-209 may be implemented as a cloud-based service, local service, native application, or combination thereof. The functions of the sharing platform 105, sharing module 117, and modules 201-209 are discussed with respect to FIGS. 3-12 below.

Figure 3:
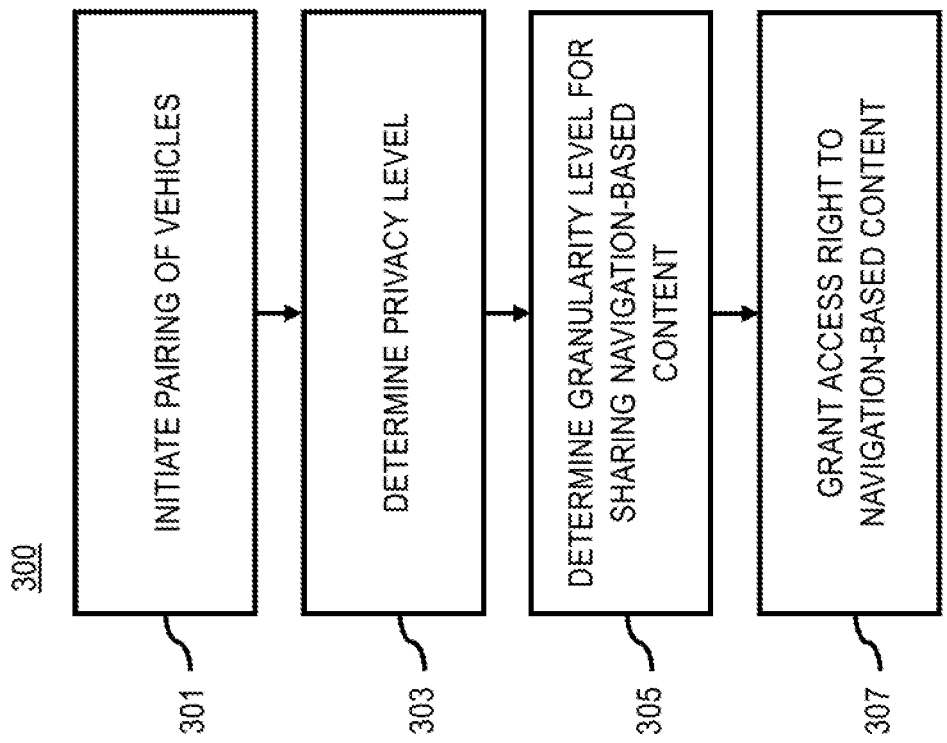
FIG. 3 is flowchart of a process for pairing vehicles to share navigation-based content, according to one embodiment.
Figure 15:
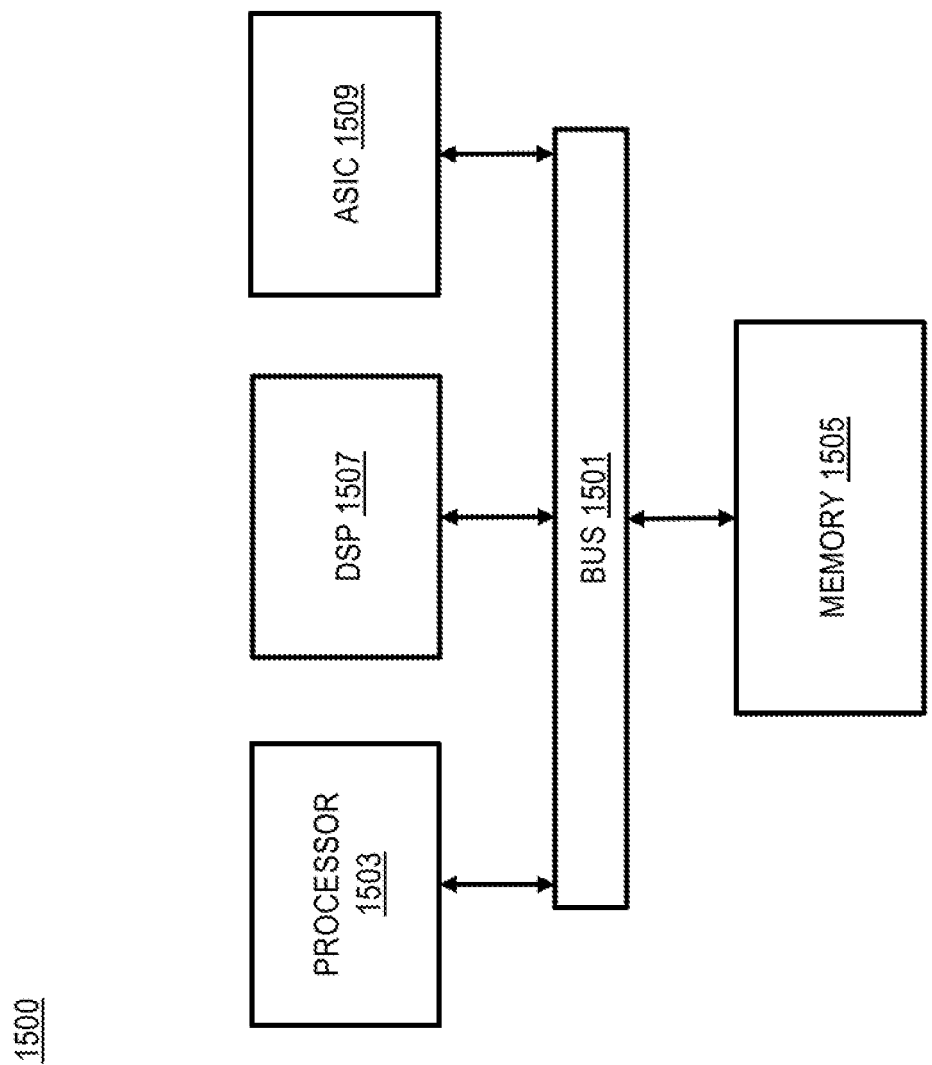
FIG. 15 is a diagram of a chip set that can be used to implement an embodiment.

FIG. 3 is flowchart of a process for pairing vehicles to share navigation-based content, according to one embodiment. In various embodiments, the sharing platform 105, the sharing module 117, and/or the modules 201-209 of the sharing platform 105/sharing platform 117 as shown in FIG. 2 may perform one or more portions of the process 300 and may be implemented in, for instance, a chip set including a processor and a memory as shown in FIG. 15. As such, the sharing platform 105, sharing module 117, and/or the modules 201-209 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the UI module 201 initiates a pairing of the first vehicle with the at least one second vehicle. By way of example, the first vehicle and the second vehicle may be an autonomous or HAD vehicle, an autonomous drone, or an autonomous transport-capable device, or a combination thereof. In one embodiment, a user or a passenger of an autonomous or HAD vehicle (e.g., vehicle 101n) initiates a pairing request to request access to the destination and/or live position of another autonomous or HAD vehicle (e.g., vehicle 101a). By way of example, the user or passenger, may be a member of a large group touring a foreign city or country. In one instance, all of the members of the group cannot fit into one vehicle. Therefore, the user initiates a pairing request so that she or he can follow other members of the group in a second autonomous vehicle (e.g., vehicle 101a) and ensure that the vehicle does not get lost in traffic. In one instance, the user initiates the pairing through an interaction with a UE 115 (e.g., a mobile device or a vehicle navigation device). By way of example, the user may initiate the pairing by inputting a license or number plate of the vehicle 101a (e.g., 1234 XY 789) or a vehicle identification number (VIN) into the UE 115. In one instance, the user can use a pointing device (e.g., a UE 115) to capture an image of the first vehicle (e.g., by taking a picture or video of the vehicle 101a), which can then be processed by the data processing module 203 to identify the vehicle. In another instance, the user may "capture" the vehicle (e.g., vehicle 101a) by using one or more applications associated with a UE 115 (e.g., an augmented reality (AR) application). A more detailed example of the processes for pairing at least two vehicles is discussed with respect to FIG. 4 below.

Figure 4:
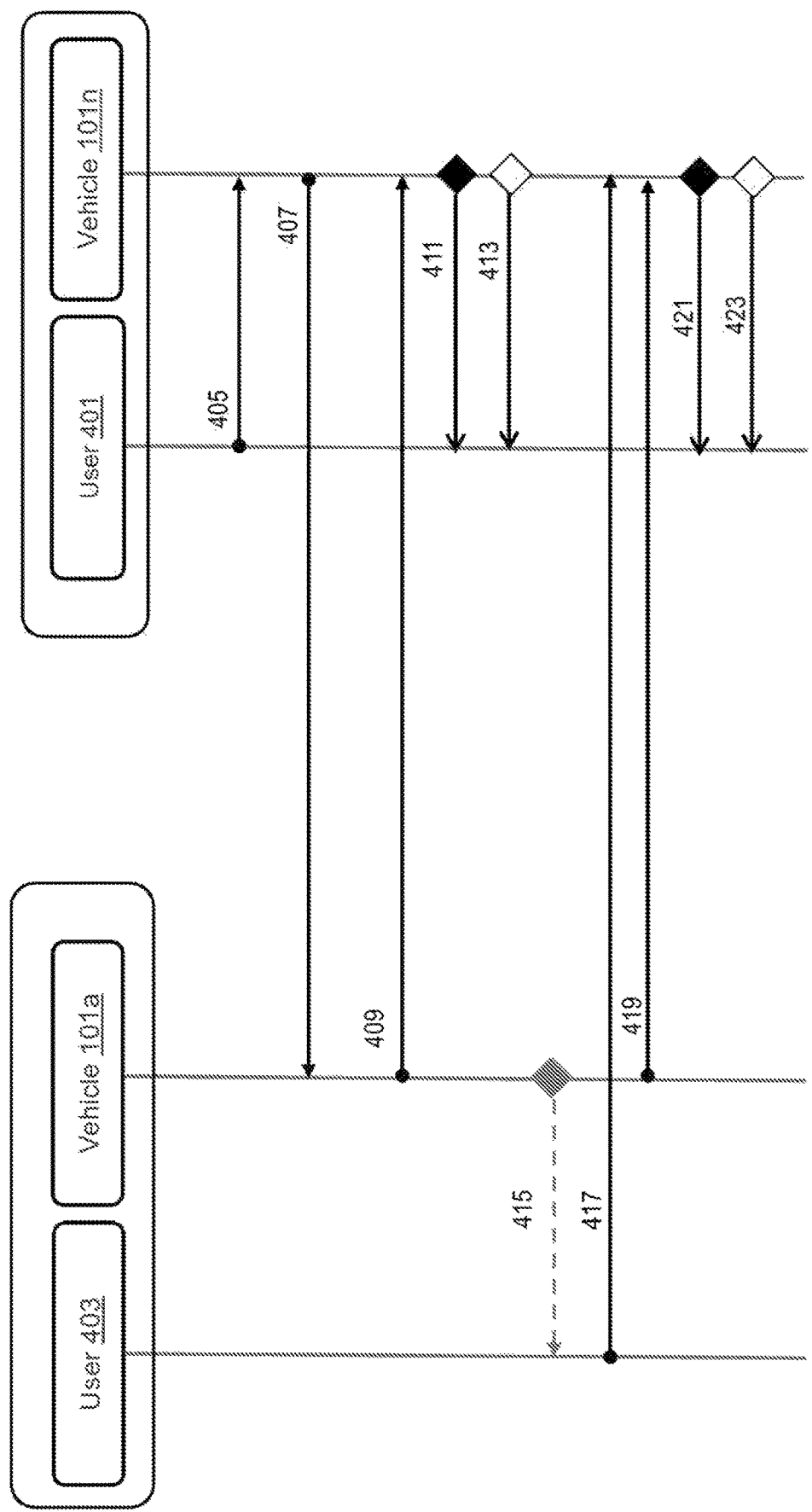
FIG. 4 is a time sequence diagram that illustrates a sequence of messages and processes for pairing vehicles to share navigation-based content, according to one embodiment.

FIG. 4 is a time sequence diagram that illustrates a sequence of messages and processes for pairing vehicles to share navigation-based content, according to one embodiment. More specifically, FIG. 4 is a ladder diagram that illustrates a sequence of messages and processes for pairing vehicles for sharing navigation-based content using the sharing platform 105/sharing module 117. A network process is represented by a thin vertical line. A step or message passed from one process to another is represented by horizontal arrows. A dashed horizontal arrow represents an optional step or conditional step.

The processes represented in FIG. 4 are a user or a passenger 401 ("user 401") of the autonomous or HAD vehicle 101n and a user or a passenger 403 ("user 403") of the autonomous or HAD vehicle 101a. In this instance, vehicle 101a is the lead vehicle 101 (i.e., the "target" vehicle receiving the pairing request) and vehicle 101n is the follower vehicle 101 (i.e., the requesting vehicle). In step 405, the user 401 initiates a pairing of the vehicles 101n and 101a as described above with respect to step 301 (e.g., via a number plate, VIN number, or a pointing device). In one embodiment, once the UI module 201 initiates the pairing, the communication module 205 transmits a pairing request to a first component of the first vehicle (e.g., a UE 115 such as a vehicle navigation device), a first device of a first passenger of the first vehicle (e.g., a UE 115 such as a mobile device), or a combination thereof from a second component of the at least one second vehicle (e.g., a UE 115 such as a vehicle), a second device of a second passenger of the at least one second vehicle (e.g., a UE 115 such as a mobile device), or a combination thereof. In this example, the communication module 205 transmits a pairing request from the vehicle 101n to the vehicle 101a in step 407.

In step 303 of FIG. 3, once the communication module 205 transmits the pairing request, the configuration module 207 determines a privacy level associated with the pairing. By way of example, the privacy level of a target vehicle (e.g., vehicle 101a) may be public, private, or a combination thereof. In one embodiment, the privacy level pertains to the requesting vehicle's (e.g., vehicle 101n) ability to access to the target vehicle's navigation-based content such as destination information, real-time position information (e.g., live location information), or a combination thereof. In one instance, the privacy level may be fixed (e.g., based on a vehicle type such as a bus), adjustable (e.g., based on a user selection or setting, one or more temporal criteria such as a time of day and/or a day of the week, etc.), or a combination thereof. For example, in one instance the target vehicle (e.g., vehicle 101a) may have a public privacy level near or en route to live events, but a private privacy level near or en route to a user's home or work. In another instance, the target vehicle (e.g., vehicle 101a) may have a public privacy level during the week, but a private privacy level during the weekends. Similarly, the target vehicle (e.g., vehicle 101a) may have a public privacy level from 9 a.m. to 5 p.m. during the week, but a private privacy level outside of that time frame.

In one embodiment, a user may opt-in and opt-out of the public/private privacy level associated with a vehicle 101 (e.g., vehicle 101a). For example, in some contexts, a user may be willing to share her or his live position or destination with anyone (e.g., when the user is traveling to a live event) so that other fans or attendees can follow the user in their respective autonomous or HAD vehicles. In most other cases, however, a user may want to restrict access to her or his live position and destination to people who have been previously granted access as described above.

In step 409, The communication module 205 determines whether the target vehicle (e.g., vehicle 101a) is publicly broadcasting its route (e.g., in the case of a city bus). If yes, the communication module 205 can transmit a notification to the user 401 (e.g., via a UE 115) in step 411 that the pairing was successful. If no, the communication module 205 can transmit a notification to the user in step 413 that the pairing was declined.

In one embodiment, a successful pairing (step 411) is based on receiving an input (step 409) at the first component (e.g., a UE 115 such as a vehicle navigation device), the first device (e.g., a UE 115 such as a mobile device), or combination thereof approving the pairing request. In the example of FIG. 4, the input is received at the first component (e.g., a UE 115 such as a vehicle navigation device). As discussed in step 303, in one embodiment, the input (step 409) further specifies the privacy level associated with the pairing (e.g., public, private, or a combination thereof).

In step 305, once the configuration module 203 determines a privacy level (e.g., public and/or private), the authorization module 209 can determine a granularity level for sharing the navigation-based content of the first vehicle (e.g., vehicle 101a) with the at least one second vehicle (e.g., vehicle 101n) based on the privacy level. In one instance, the granularity level pertains to the amount or type of navigation-based content that the vehicle 101n can access relative to the vehicle 101a while paired. In one embodiment, the granularity includes at least one of: a first granularity level that shares both the destination information and the real-time location information (i.e., complete access); a second granularity level that shares only one of the destination information or the real-time location information (i.e., partial access); and a third granularity level that shares the destination information, the real-time location information, or a combination thereof at a reduced level of precision (i.e., approximate information). In the example where the configuration module 207 determines that the vehicle 101a is publicly broadcasting its route (e.g., a bus), the authorization module 209 can determine that the vehicle 101 also has a first granularity level (i.e., complete sharing of the destination-based information). In contrast, in the example where the configuration module 207 determines that the vehicle 101 has private privacy level (e.g., a private vehicle), the authorization module 209 can determine that the vehicle 101 has either a first level, a second level, a third granularity level, or a combination thereof. For example, the vehicle 101 may have a second granularity level (i.e., actual destination or location) between 9 a.m. and 5 p.m. and a third granularity level (i.e., approximate destination and/or location) outside of those hours.

In step 307, the communication module 205 grants an access right to the at least one second vehicle (e.g., vehicle 101n) to access the navigation-based content at the determined granularity level. In one instance, upon being granted access, the at least one second vehicle (e.g., vehicle 101n) is guided based on the navigation-based content of the first vehicle (e.g., vehicle 101a) at the determined granularity level. In this instance, "guided" means that the vehicle 101n properly follows vehicle 101a (e.g., does not lose vehicle 101a in traffic). In one example, vehicle 101a may arrive at the destination ahead of vehicle 101n (e.g., where the user 403 wants to greet the passengers of vehicle 101n) or the vehicles 101a and 101n may arrive at the destination together. In one embodiment, in the case of the private privacy level, once the requesting vehicle (e.g., vehicle 101n) reaches the destination, the authorization module 209 can revoke vehicle 101n's access rights.

In one embodiment, the authorization module 209 may optionally determine the granularity level and/or access rights based on the identity of the requesting user (e.g., user 401). For example, the data processing module 203 may access one or more databases (e.g., the geographic database 119, the services 123, etc.) to identify the requesting user. It is contemplated that the identity may be named based or the identity may be based on one or more identifying characteristics (e.g., an age, a relationship to the user 403, etc.). Then, once the data processing module 203 determines the identity, the communication module 205 can transmit a notification to the user 403 in the step 415 and the authorization module 209 will then wait for an input from the user (e.g., a gesture with a UE 115 or a voice command) in step 417 accepting the pairing request or declining the pairing request. Once the authorization module 209 determines the input of the user (e.g., user 403) or the vehicle (e.g., vehicle 101a), the communication module 205 can transmit a notification to a user (e.g., a user 401) via a UE 115 (e.g., a vehicle navigation device) informing the user that the pairing was successful (step 421) or the pairing was declined (step 423).

In one embodiment, the authorization module 209 may automatically accept the pairing request or decline the pairing request (step 419) based on the identity of the requesting user (e.g., user 401) without an input from the user (e.g., user 101a) and/or based on one or more access-based rules. By way of example, the data processing module 203 may identify the requesting user as being within one or more categories, which may be associated with one or more rules with respect to access to the navigation-based content of the target vehicle (e.g., vehicle 101a). For example, the authorization module 205 may automatically grant a close family member access to both destination information and real-time location information (i.e., complete access). In contrast, the authorization module 209 may require one or more inputs from the user before determining the granularity level and/or an access right for a friend or colleague. Alternatively, depending on the identity of the requesting user (e.g., a friend that the user 403 normally carpools to work with), the authorization module 209 may be preprogramed to grant access based on a second granularity level (e.g., granting access to a destination, but not a location). In the case of a stranger, the authorization module 209 may automatically decline a request for pairing unless the user 403 overrides the determination (e.g., based on one or more inputs). For example, the user 403 may meet someone new to the system 100 at a coffee shop and then want to travel together (e.g., vehicle 101n following vehicle 101a) to a second destination (e.g., a restaurant).

Figure 5:
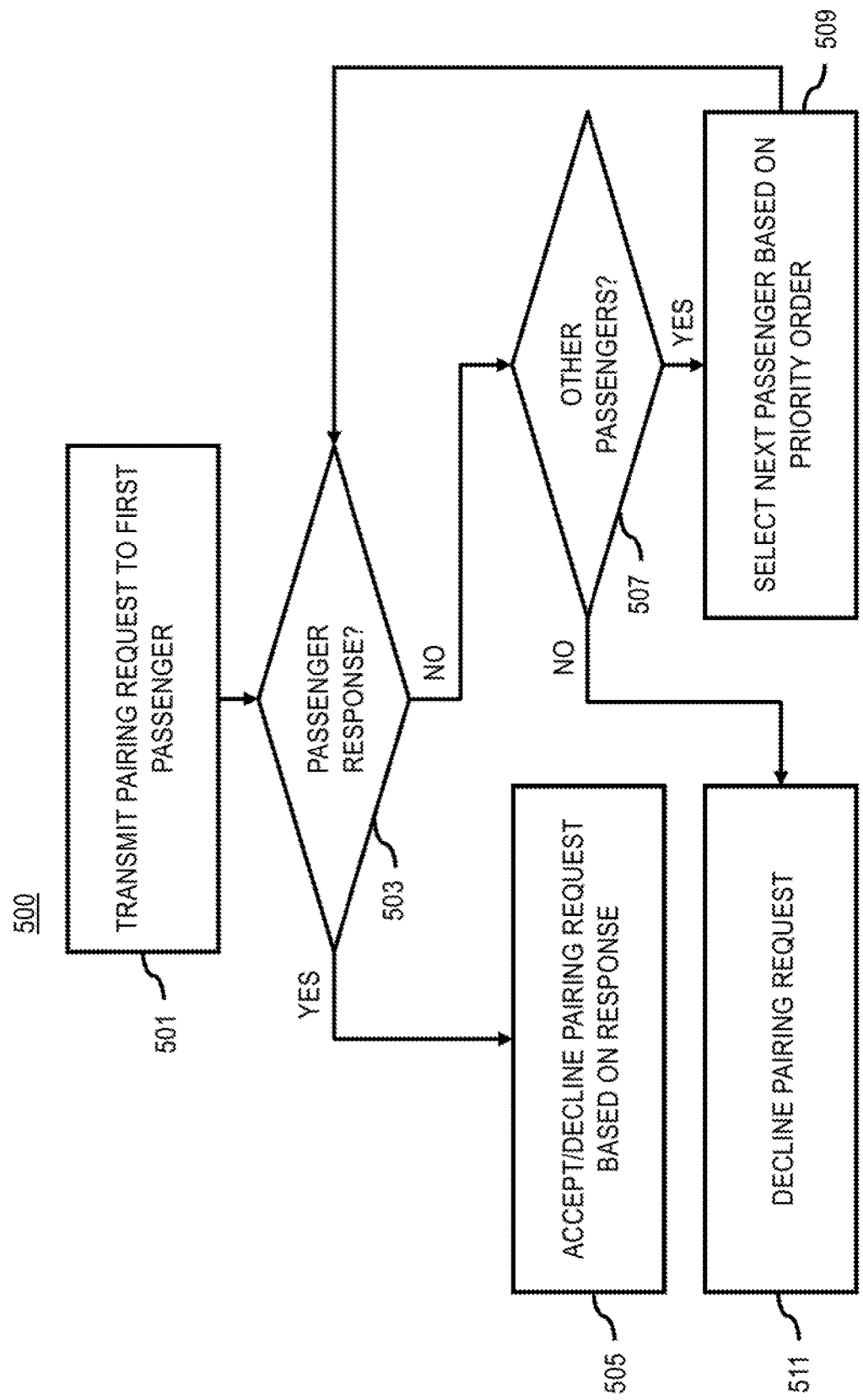
FIG. 5 is a flowchart of a process for prioritizing the recipients of a request to pair vehicles for sharing navigation-based content, according to one embodiment.

FIG. 5 is a flowchart of a process for prioritizing the recipients of a request to pair vehicles for sharing navigation-based content, according to one embodiment. In various embodiments, the sharing platform 105, the sharing module 117, and/or the modules 201-209 of the sharing platform 105/sharing module 117 as shown in FIG. 2 may perform one or more portions of the process 500 and may be implemented in, for instance, a chip set including a processor and a memory as shown in FIG. 15. As such, the sharing platform 105, sharing module 117, and/or the modules 201-209 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the communication module 207 transmits a pairing request to a device of the user 403 (e.g., a UE 115 such as a mobile device). In step 503, the authorization module 209 determines whether the user 403 has responded to the request (e.g., based on one or more inputs such as a gesture or a voice-command). In the instance where the authorization module 209 determines that the user 403 has responded, the authorization module 209 then determines in step 505 whether the user has accepted the pairing request (step 421) or has declined the pairing request (step 423).

In the example where the authorization module 209 determines in step 503 that the user 403 has not responded, the data processing module 203 can determine in step 507 whether there are any other users or passengers in the vehicle 101*a* that may be able to accept the pairing request. In one instance, the data processing module 203 may be able to determine the presence of other passengers in the vehicle 101 based on an activity associated with a user's UE 115 (e.g., a social media post, a cell phone tower handshake, etc.). If the data processing module 203 determines that there are no other users or passengers in the vehicle 101*a*, the authorization module 209 will decline of the pairing request in step 511. Alternatively, if the data processing module 203 determines that there are other users or passengers in the vehicle 101*a* (e.g., user A, user B, and user C), the communication module 205 can transmit the pairing request to one of the other users or passengers. In one embodiment, the communication module 205 transmits the pairing request to a subsequent device (e.g., a UE 115) of a subsequent passenger (e.g., user B) among the plurality of passengers (e.g., user A, user B, and user C) based on determining that the first passenger (e.g., user 403) has not responded to the pairing request within a time window (e.g., 1 minute). In step 509, the data processing module 203 then determines a priority order of the plurality of passengers based on one or more characteristics of the plurality of passengers. In one instance, the communication module 205 transmits the pairing request to the first passenger (e.g., user 403), the subsequent passenger (e.g., user A, user B, user C, etc.), or a combination thereof based on the priority order. By way of example, the communication module 205 may first transmit the pairing request to the user entering the destination in the vehicle 101*a* (e.g., user 403). Therefore, the communication module 205 may transmit the pairing request to a spouse or kid in the vehicle 101, depending on the age of the child.

Figure 6:
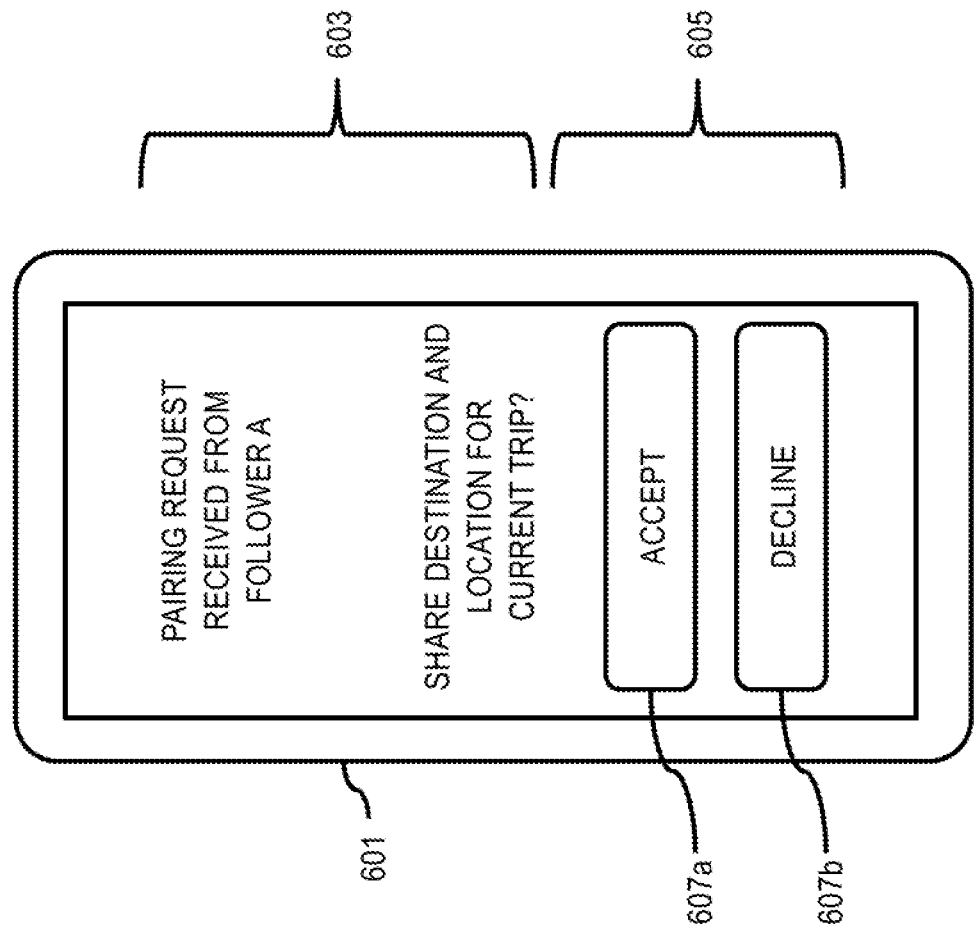
FIG. 6 is a diagram of an example user interface for approving a pairing request for sharing navigation-based content, according to one embodiment.

FIG. 6 is a diagram of an example user interface for approving a pairing request for sharing navigation-based content, according to one embodiment. In this example, a UI 601 is generated for a UE 115 (e.g., a vehicle navigation device, a mobile device, or a combination thereof) that includes a display area 603 for one or more notifications transmitted by the communication module 205 (e.g., "pairing request received from follower A" and "share destination for current trip?") and a display area 605 for one or more input targets (e.g., a virtual button 607*a* "accept" and a virtual button 607*b* "decline") with which a user (e.g., user 403) can accept or decline a pairing request. It is contemplated that in addition to using one or more gestures to approve or decline the requested access, the UI 601 may support one or more voice commands, one or more gestures, or a combination thereof.

Figure 7:
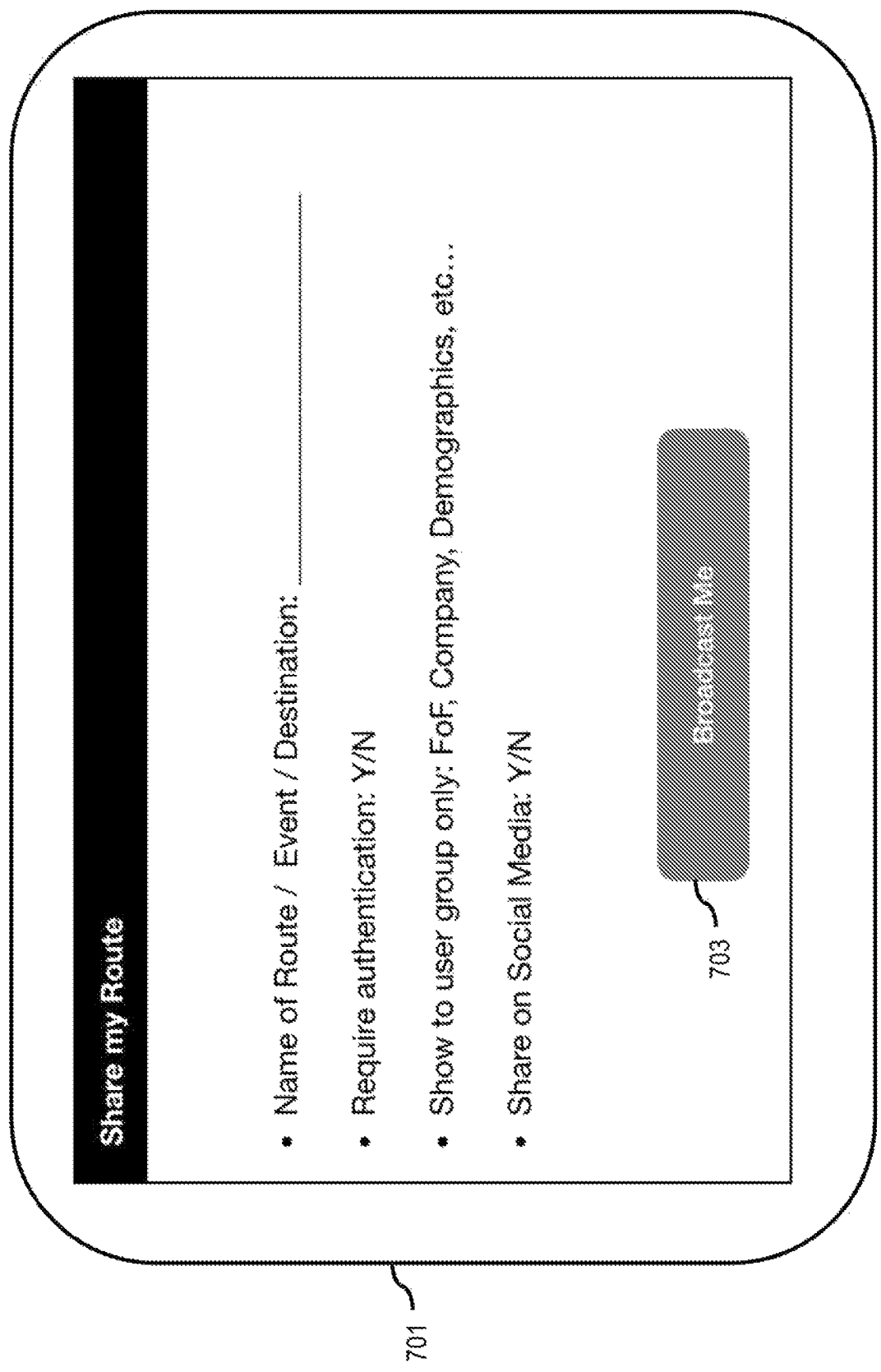
FIG. 7 is a diagram of an example user interface for sharing a route to support pairing vehicles to share navigation-based content, according to one embodiment.

FIG. 7 is a diagram of an example user interface for sharing a route to support pairing vehicles to share navigation-based content, according to one embodiment. In this instance, a UI 701 is generated for a UE 115 (e.g., a vehicle navigation device, mobile device, or a combination thereof) that enables a user (e.g., user 403) to broadcast the navigation-based content of the vehicle 101*a* based on one or more parameters set through the UI 701. For example, the user 403 can share or broadcast their destination during an "open air" or off-road event. In this instance, the user can enter a route, an event, or a destination. By way of example, if a group of colleagues are attempting to travel together to a destination after work, the user 403 can use the UI 701 to identify the route that the vehicle 101*a* will take (e.g., if the user 403 knows shortcuts or best routes to take). For example, the user (e.g., user 403) may not know the address of the destination, but she or he knows the best way to get there. By sharing the position of the vehicle 101*a* and pairing with people who also want to go there (e.g., user 401), the user 403 provides "delayed" assistance. In another instance, the user 403 can simply identify the name or address of the destination and it is contemplated that the sharing platform 105 can determine a route based on the name of the destination (e.g., by accessing the geographic database 119 and/or the services 123). In another example, the user 403 can identify an event (e.g., a concert or a sporting event) where the vehicle 101*a* is going and the sharing platform 105 can again determine a destination and/or route based on the name of the event (e.g., accessing the geographic database 119 and/or the services 123).

In one example, a user (e.g., user 403) may also use the UI 701, to set the privacy mode of the vehicle 101*a*. For example, the user can set the privacy level of the vehicle 101*a* to public so that when the user broadcasts the destination-based content, the sharing platform 105 will accept any pairing requests that another user (e.g., user 401) may initiate and, therefore, provide the user 401 access to the destination and/or real-time location of the vehicle 101*a*. Alternatively, the user 403 can set the privacy level of the vehicle 101*a* to private so that when the destination-based content is broadcasted, other users (e.g., user 401) must first request access.

In another example, the user can use the UI 701, to set a "range" of the broadcast. For example, the user can use the UI 701 to set the privacy level of the vehicle 101*a* based on an identity of the requesting user (e.g., user 401). The user 403, in one instance, can decide that the privacy level of the vehicle 101*a* is public for friends-of-family (FoF) and/or colleagues (i.e., access is automatically granted) and private for users outside of this group (i.e., access must be requested). Likewise, the user can use the UI 701 to set the privacy level based on one or more demographics (e.g., public within a similar age threshold and private for outside a similar age threshold). In this example, the user can expand the range to include social media (e.g., a profile update). Once initiated (e.g., by touching the "broadcast me" button 703), the sharing platform 105 broadcasts the navigation-based content. Other users (e.g., user 403) can then search their navigation systems for that event and pair their navigation system with the location (i.e., the GPS coordinates of the broadcasting).

Figure 8A:
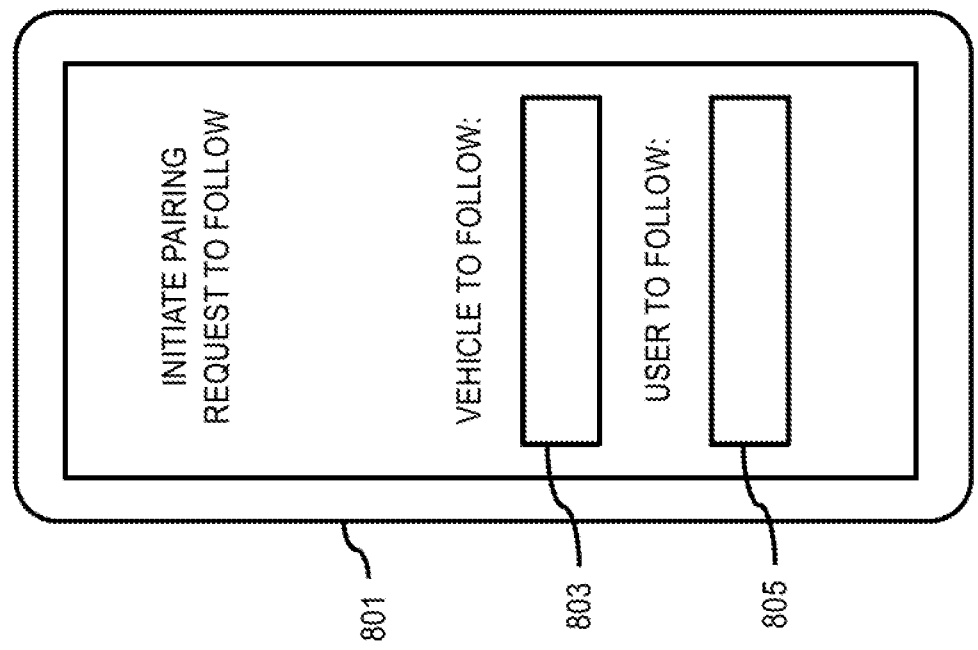
FIGS. 8A and 8B are diagrams of example user interfaces for initiating a pairing request for sharing navigation-based content between vehicles, according to one embodiment.
Figure 8B:
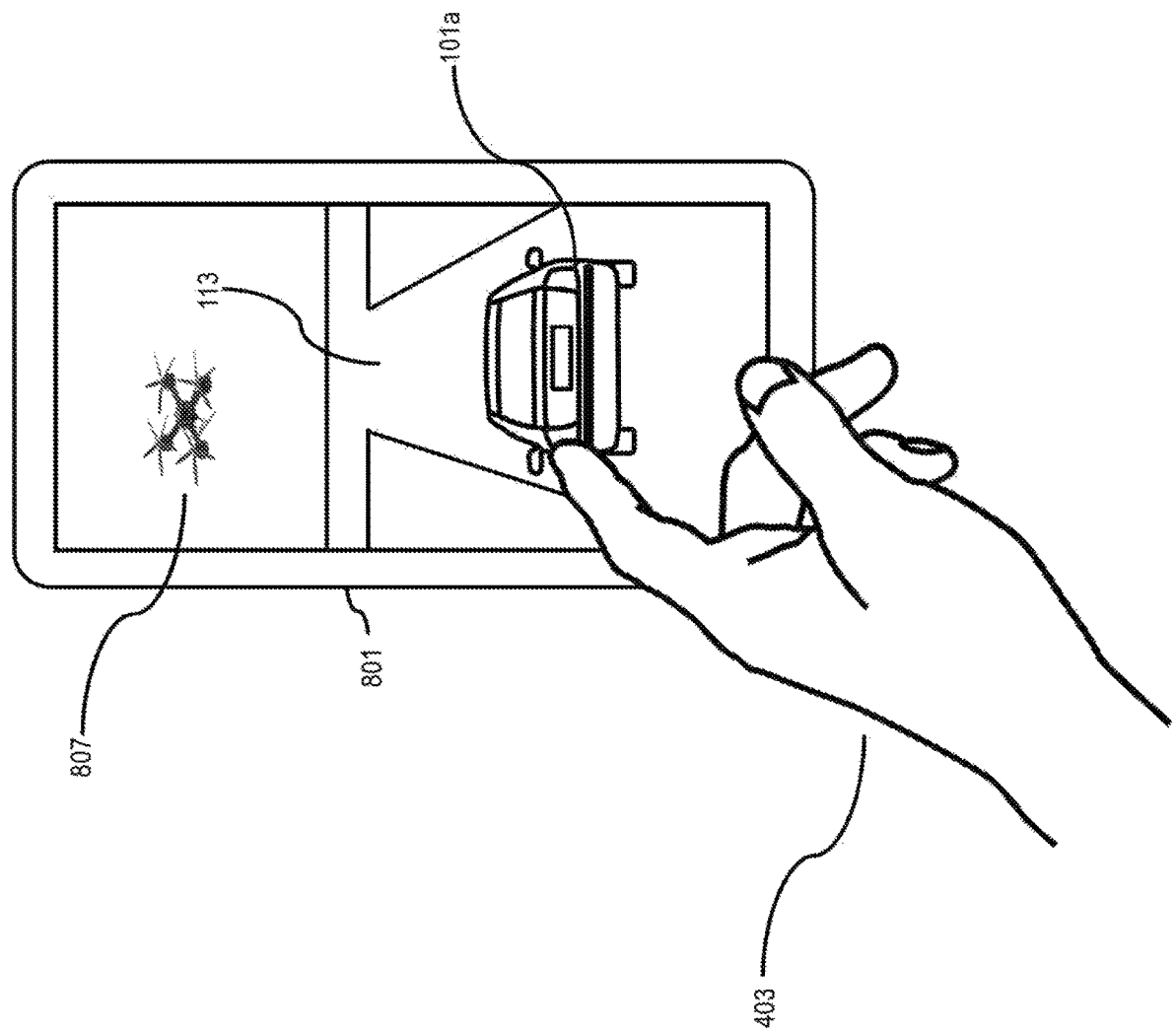

FIGS. 8A and 8B are diagrams of example user interfaces for initiating a pairing request for sharing navigation-based content between vehicles, according to one embodiment. In this example, a UI 801 is generated for a UE 115 (e.g., a vehicle navigation device, a mobile device, or a combination thereof) that includes an input 803 that enables a user (e.g., a user 401) to enter a number plate or VIN associated with "a vehicle to follow" (e.g., vehicle 101*a*) and an input 805 that enables a user to additionally or alternatively enter the name of a user that the user 401 wants to follow (e.g., Joe). In the use case where a group of colleagues want to travel together to a destination (e.g., a restaurant after work), the user 401 (e.g., Mike) can initiate a pairing request to follow the vehicle that user 403 (e.g., Joe) is in (e.g., vehicle 101a) by inputting either the vehicle information (e.g., plate "1234 XY 789") using input 803 or the name of a user (e.g., Joe) using input 805. As described above with respect to FIG. 4, the user of the target vehicle (e.g., vehicle 101a) can then decide whether to either accept or decline the pairing request.

Referring to FIG. 8B, in some instances, the requesting user (e.g., user 401) may not know either the identity of the vehicle or of the user associated with the vehicle 101a (e.g., an autonomous or HAD vehicle) that she or he wants to follow (e.g., to a restaurant). In one embodiment, the user 403 can use the UI 801 to "capture" an autonomous or HAD vehicle (e.g., vehicle 101a) or a transport-capable device such as the drone 807 traveling along the route 111. For example, the requesting user (e.g., user 403) can tap on or touch the vehicle 101a or the drone 807 in the UI 801 to first learn the identity of the vehicle (e.g., plate "1234 XY 789"), the user (e.g., Joe based on the plate), or a combination thereof before initiating a pairing request. Once the UI 801 identifies the vehicle or user, the UI 801 can prompt the requesting user to confirm that she or he still wants to initiate a pairing request. This prompt may be advantageous in situations where the user has mistaken the vehicle ahead of her or him with a vehicle of someone that they know. Then, once the pairing request is initiated (e.g., tapping on the vehicle 101a in the UI 801), the user of the target vehicle (e.g., vehicle 101a) or the drone 807 can decide whether to either accept or decline the pairing request as described above with respect to FIG. 4.

Figure 9:
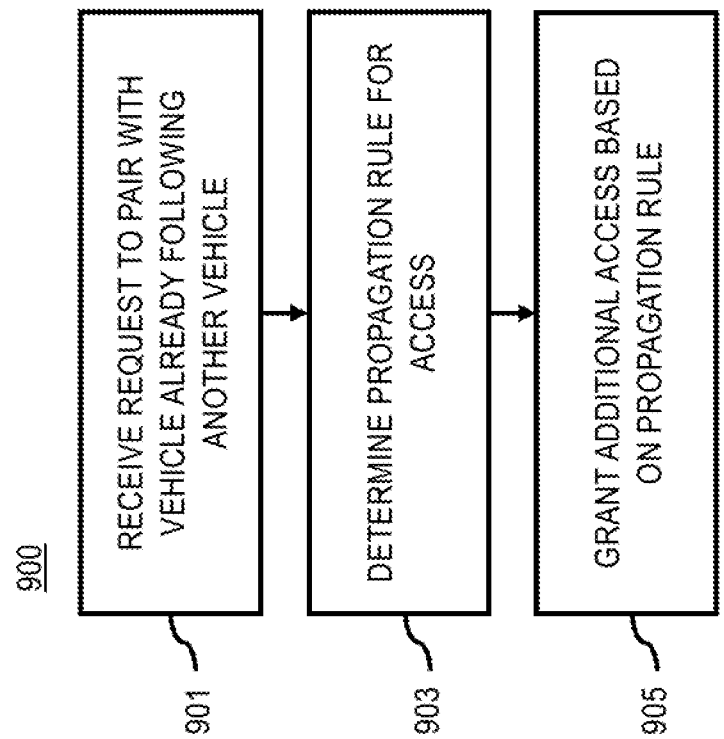
FIG. 9 is flowchart of a process for propagating access rights for sharing navigation-based content, according to one embodiment.

FIG. 9 is flowchart of a process for propagating access rights for sharing navigation-based content, according to one embodiment. In various embodiments, the sharing platform 105, the sharing module 117, and/or the modules 201-209 of the sharing platform 105/sharing platform 117 as shown in FIG. 2 may perform one or more portions of the process 900 and may be implemented in, for instance, a chip set including a processor and a memory as shown in FIG. 15. As such, the sharing platform 105, sharing module 117, and/or the modules 201-209 can provide means for accomplishing various parts of the process 900, as well as means for accomplishing embodiments of other processes described herein in conjunction with other components of the system 100. Although the process 900 is illustrated and described as a sequence of steps, it is contemplated that various embodiments of the process 900 may be performed in any order or combination and need not include all of the illustrated steps.

In step 901, the communication module 205 receives a pairing request from a third vehicle for another access right to follow the at least one second vehicle (e.g., vehicle 101n). By way of example, a third vehicle 101 (e.g., vehicle X) may ask a second vehicle for the right to follow it (e.g., to a sporting event). In this instance, the vehicle 101n is already paired with and following another vehicle (e.g., vehicle 101a) and, therefore, vehicle X is indirectly requesting access to follow the first vehicle (e.g., vehicle 101a).

In step 903, the configuration module 207 determines a propagation rule for the access right granted to the at least one second vehicle (e.g., vehicle 101n) with respect to the first vehicle (e.g., vehicle 101a). In one instance, the configuration module 207 can determine that the first vehicle is configured so that the given rights to a second vehicle can be shared with other vehicles such as the third vehicle (e.g., vehicle X). This can be advantageous in a situation where many vehicles 101 are traveling to a destination such as a live event so that the first vehicle (e.g., vehicle 101a) is not constantly receiving pairing requests which may be annoying to a user or a passenger (e.g., user 403) and/or can drain one or more computational or electronic resources of the vehicle 101a (e.g., a battery). In another instance, the configuration module 207 can determine that the second vehicle (e.g., vehicle 101n) is not configured to share the first vehicle's access rights with other vehicles. Thus, the second vehicle must initiate a new pairing request to allow vehicle X to follow it.

In step 905, the authorization module 209 can grant another access right to the third vehicle to follow the at least one second vehicle (e.g., vehicle 101n) based on the propagation rule. In one instance, it is contemplated that the access rights granted to the third vehicle may be the same as the access rights granted to the second vehicle (e.g., vehicle 101n); however, it is also contemplated that the access rights may be different. For example, the third vehicle may be able to access the destination information by default or by a new validation, but the vehicle may not be granted access to the real-time location of the first vehicle (e.g., vehicle 101a), which was granted to the second vehicle (e.g., vehicle 101a).

Figure 10:
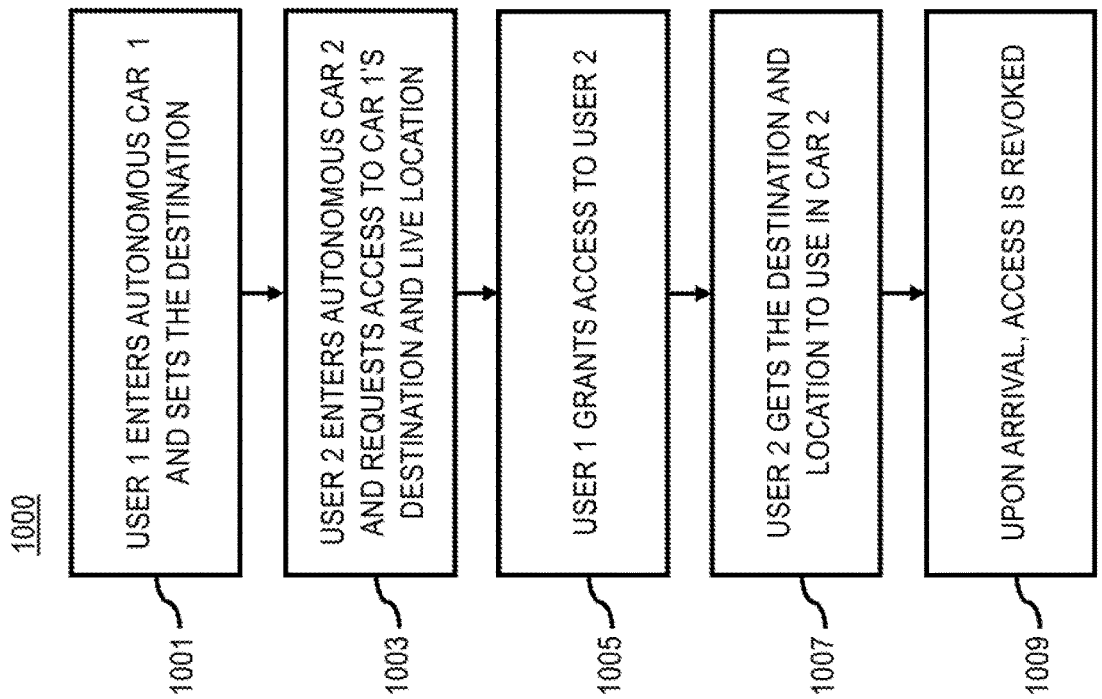
FIG. 10 is a flowchart of an example process for sharing navigation-based content between vehicles, according to one embodiment.

FIG. 10 is a flowchart of an example process for sharing navigation-based content between vehicles, according to one embodiment. In various embodiments, the sharing platform 105, the sharing module 117, and/or the modules 201-209 of the sharing platform 105/sharing platform 117 as shown in FIG. 2 may perform one or more portions of the process 1000 and may be implemented in, for instance, a chip set including a processor and a memory as shown in FIG. 15. As such, the sharing platform 105, sharing module 117, and/or the modules 201-209 can provide means for accomplishing various parts of the process 1000, as well as means for accomplishing embodiments of other processes described herein in conjunction with other components of the system 100. Although the process 1000 is illustrated and described as a sequence of steps, it is contemplated that various embodiments of the process 1000 may be performed in any order or combination and need not include all of the illustrated steps.

In step 1001, user 1 (e.g., user 403) enters a first autonomous or HAD vehicle (e.g., vehicle 101a) and sets the destination (e.g., a museum). In this example, user 1 is part of a large group that want to explore the city together; however, they cannot all fit comfortably in the vehicle 101a. In step 1003, a user 2 (e.g., user 401) of the group enters a second autonomous or HAD vehicle (e.g., vehicle 101n) and requests access to the destination and live location (e.g., real-time position) of vehicle 101a through the sharing platform 105. In step 1005, user 1 grants user 2 access to both the destination (e.g., the museum) and the real-time position of vehicle 101a through the sharing platform 105. In step 1007, the sharing platform 105 transmits the destination and the live location of the vehicle 101a to vehicle 101n. In step 1009, once the vehicle 101n arrives at the destination, the sharing platform 105 revokes and/or resets the vehicle 101n's access rights to vehicle 101a.

FIG. 11 is a diagram of an example user interface for generating a vehicle request to initiate sharing of navigation-based content between vehicles, according to one embodiment. In one embodiment, the sharing platform 105 determines that more than one vehicle 101 is required to fulfil a vehicle request or a customer travel request. In this example, a UI 1101 is generated for a UE 115 (e.g., a vehicle navigation device, mobile device, or a combination thereof) that includes an input 1103 by which a user (e.g., a user 401) can enter the number of passengers that wish to travel together by an autonomous or HAD vehicle 101 to a destination. Based on the user's input of "6 passengers," the sharing platform 105 can determine that 2 vehicles 101 are needed to fulfill the user's request, as shown in the display area 1105. In one embodiment, the sharing platform 105 selects the first vehicle (e.g., vehicle 101*a*), the at least one second vehicle (e.g., one or more vehicles 1109*a*-1109*n*, also collectively referred to herein as vehicles 1109), or a combination thereof based on one or more parameters of the vehicle request (e.g., a pick-up location, a destination, or a combination thereof).

In one instance, the sharing platform 105 shares the destination with the vehicles 1109 (if privacy allows). In another instance, the sharing platform 105 may share an area or a pick-up point at a reasonable distance from the real destination (e.g., to protect the secret of the destination). In one embodiment, the vehicles 101 and 1109 publish to each other their level of sharing criteria (e.g. their pairing preference 1111*a*-1111*n*, respectively). For example, one "exclusive" vehicle may not want to pair with any vehicles for some reason while another vehicle or type vehicle 101 or 1109 (e.g., a van) may have a less restrictive pairing policy and is able to share or rideshare within a certain distance or area. In one embodiment, to get around this potential restriction (i.e., proximity of only "exclusive" vehicles), the sharing platform 105 could enable V2V communication to find and authorize appropriate ride sharing based on the sharing level of different vehicles.

Figure 12A:
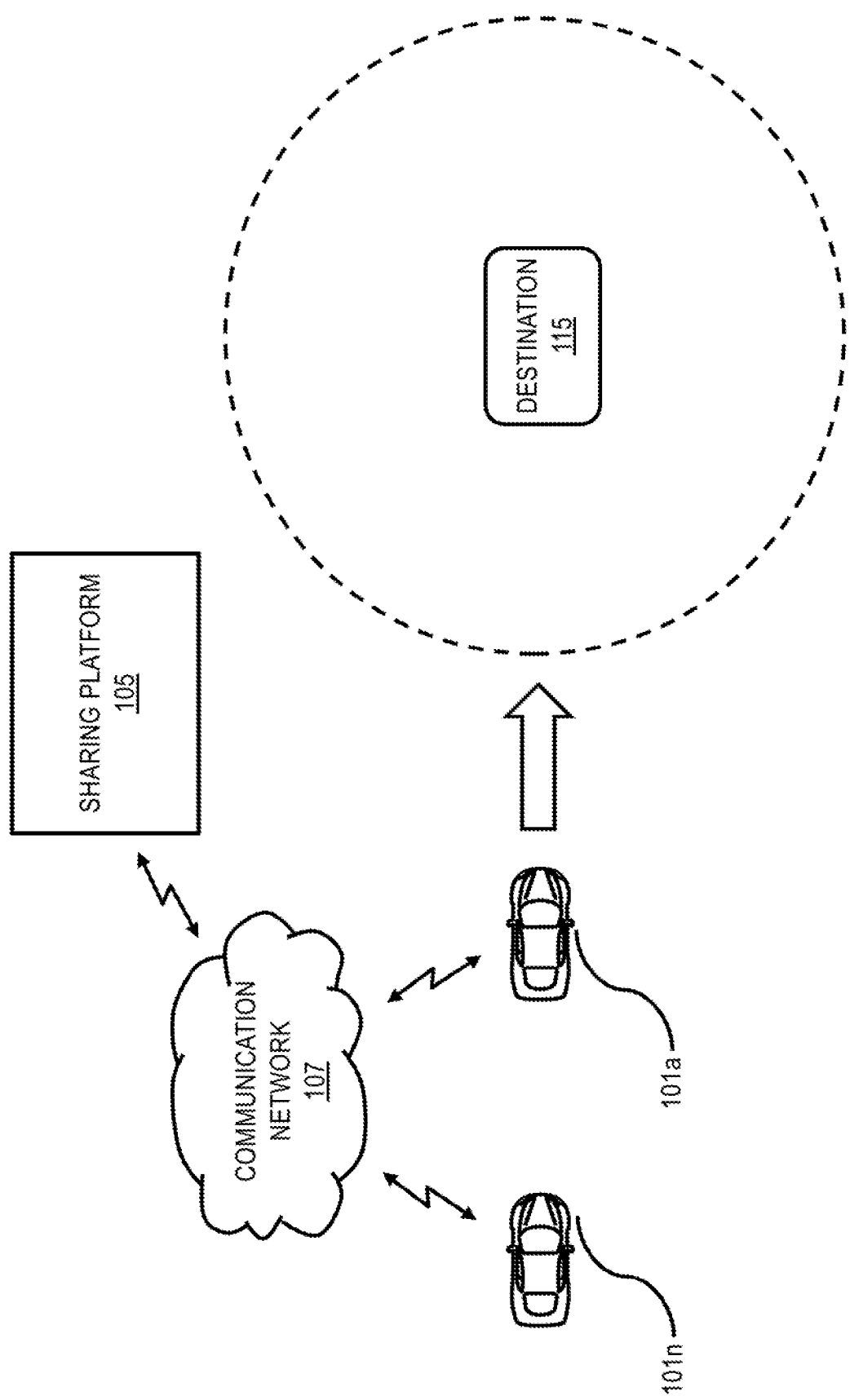
FIGS. 12A and 12B are diagrams illustrating an example incognito mode for sharing navigation-based content, according to one embodiment.
Figure 12B:
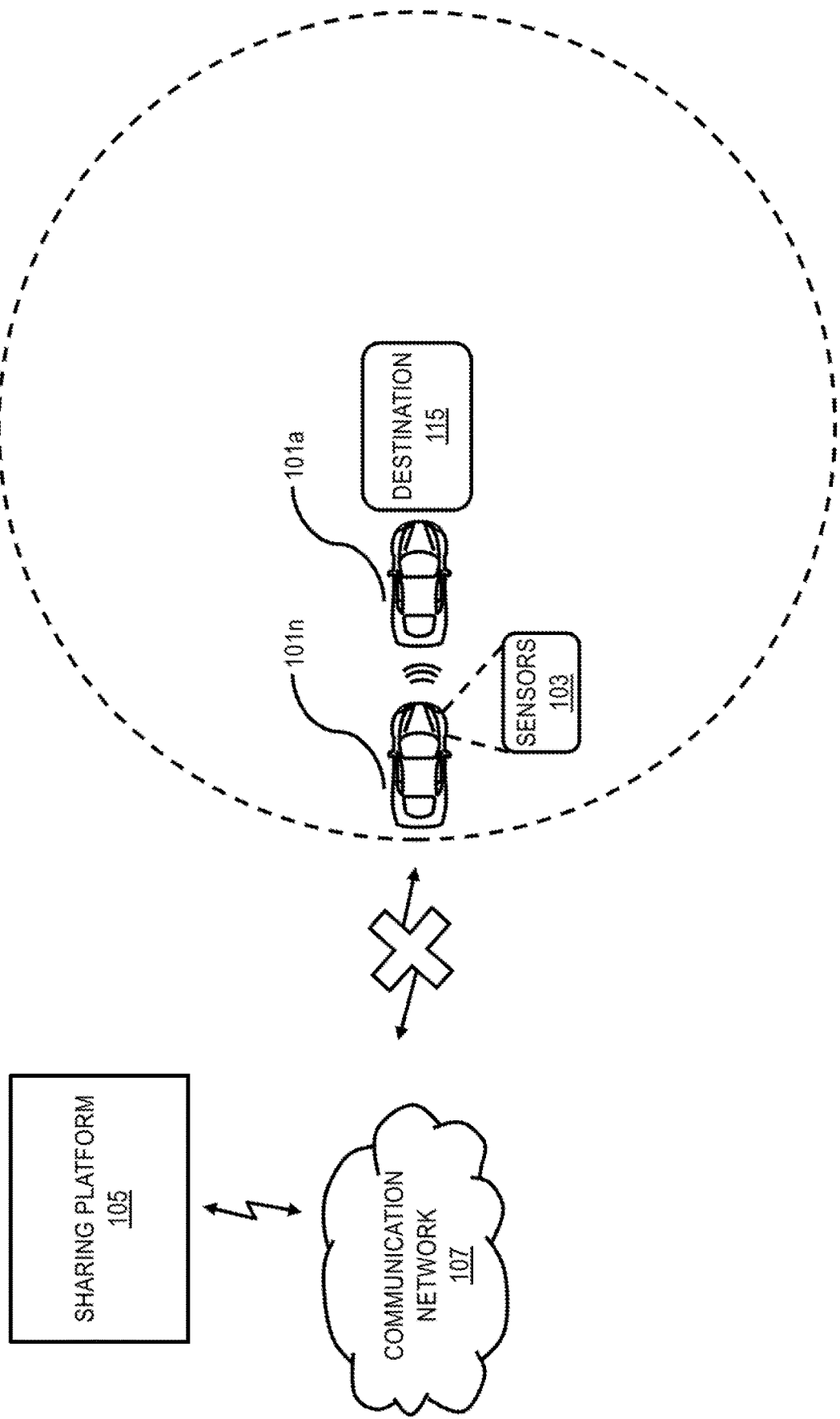

FIGS. 12A and 12B are diagrams illustrating an example incognito mode for sharing navigation-based content between vehicles, according to one embodiment. In one embodiment, wherein the navigation-based content can be shared using a network-connected technology (i.e., sharing location relevant data with servers such as communication network 107) or a non-network-connected technology (i.e., not sharing location relevant data with servers), the sharing platform 105 or sharing module 117 selects to use the network-connected technology or the non-network-connected technology based on a location of the first vehicle (e.g., vehicle 101*a*), the at least one second vehicle (e.g., vehicle 101*n*), or a combination thereof. By way of example, several paired autonomous or HAD vehicles 101 want to exit a busy city center (e.g., Paris) to travel to a destination 115 (e.g., a castle outside of Paris). Vehicle 1 (e.g., vehicle 101*a*) knows the destination 115, but the user or passenger of vehicle 101*a* (e.g., user 403) does not want to publish or broadcast it to the other vehicles 101 (e.g., vehicle 101*n*). In this instance, the sharing platform 105 can provide an intermediate destination outside of the city (e.g., a few kilometers away from the destination 115). In one embodiment, while the vehicles are farther than a threshold distance from the destination 115, the sharing platform 105 can use the network-connected technology (e.g., communication network 107) to share navigation-based content, as depicted in FIG. 12A.

Referring to FIG. 12B, once all vehicles 101 (e.g., vehicle 101*a* and 101*n*) are within a threshold distance of the destination 115 (i.e., in a much quieter environment), the user 403 can request that the other vehicles 101 follow it in "incognito mode" (e.g., using non-connected technology). In one instance, instead of sharing relevant data to servers, the vehicles 101*a* and 101*n* can use one or more sensors 103 (e.g., cameras) to share navigation-based content. In one instance, once the destination 115 is reached by all of the vehicles 101, the sharing platform 105 can request that one or more vehicles 101 (e.g., vehicle 101*n*) drive around before reporting a position or a destination to generate "noise" with respect to the exact location of the destination 115.

Figure 13:
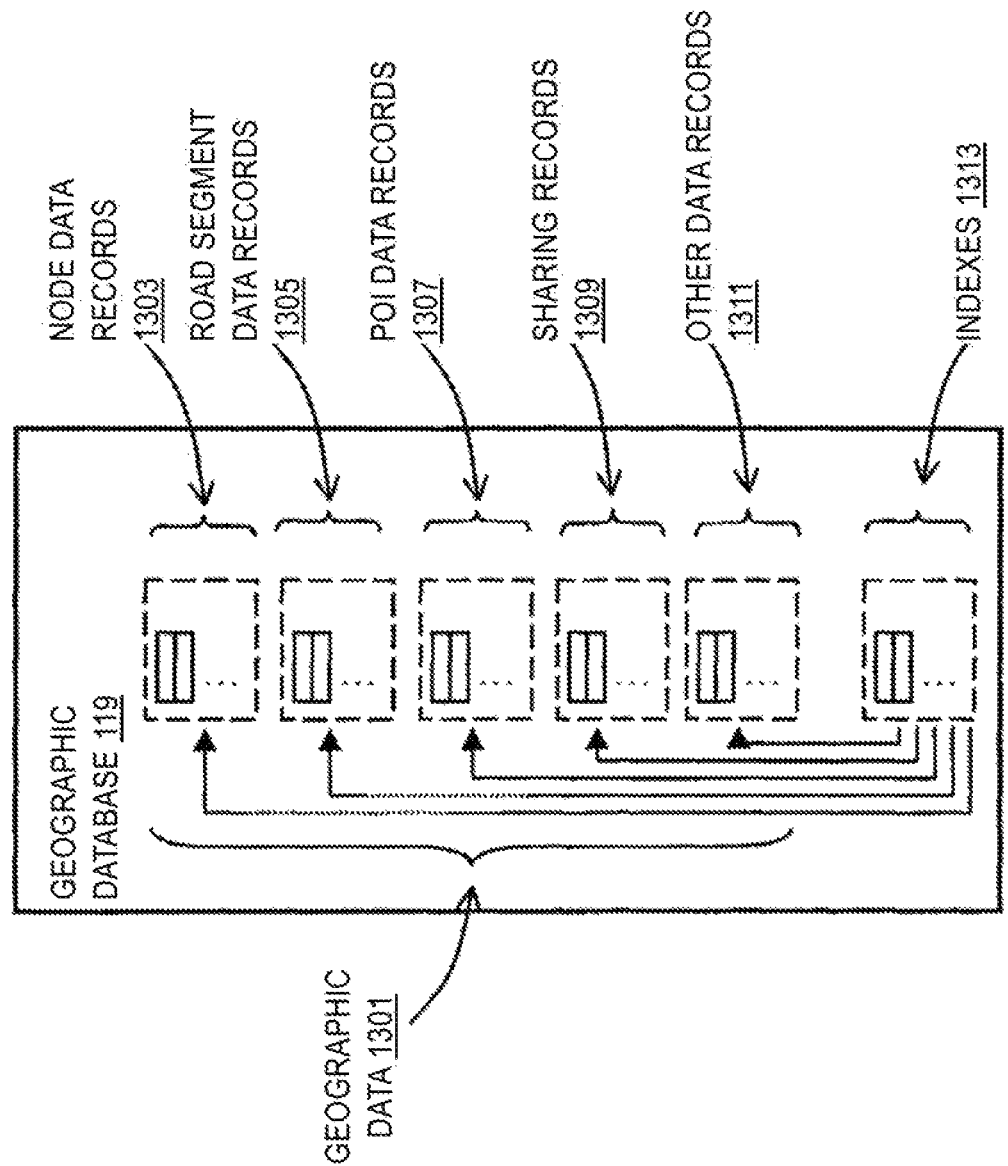
FIG. 13 is a diagram of a geographic database, according to one embodiment.

FIG. 13 is a diagram of a geographic database, according to one embodiment. In one embodiment, the geographic database 119 includes geographic data 1301 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 119.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 119 follows certain conventions. For example, links do not cross themselves and do not cross each other except at a node. Also, there are no duplicated shape points, nodes, or links. Two links that connect each other have a common node. In the geographic database 119, overlapping geographic features are represented by overlapping polygons. When polygons overlap, the boundary of one polygon crosses the boundary of the other polygon. In the geographic database 119, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 119 includes node data records 1303, road segment or link data records 1305, POI data records 1307, sharing records 1309, other data records 1311, and indexes 1313, for example. More, fewer or different data records can be provided. In one embodiment, additional data records (not shown) can include cartographic ("carto") data records, routing data, and maneuver data. In one embodiment, the indexes 1313 may improve the speed of data retrieval operations in the geographic database 119. In one embodiment, the indexes 1313 may be used to quickly locate data without having to search every row in the geographic database 119 every time it is accessed. For example, in one embodiment, the indexes 1313 can be a spatial index of the polygon points associated with stored feature polygons.

In exemplary embodiments, the road segment data records 1305 are links or segments representing roads (e.g., route 113), streets, or paths, as can be used in the calculated route or recorded route information for determination of one or more personalized routes. The node data records 1303 are end points corresponding to the respective links or segments of the road segment data records 1305. The road link data records 1305 and the node data records 1303 represent a road network, such as used by vehicles, cars, and/or other entities. Alternatively, the geographic database 119 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 119 can include data about the POIs and their respective locations in the POI data records 1307. The geographic database 119 can also include data about places, such as cities, towns, or other communities, and other geographic features, such as bodies of water, mountain ranges, etc. Such place or feature data can be part of the POI data records 1307 or can be associated with POIs or POI data records 1307 (such as a data point used for displaying or representing a position of a city).

In one embodiment, the geographic database 119 can also include sharing records 1309 for storing pairing data, privacy settings, navigation-based content, or a combination thereof related to the vehicles 101, the users or passengers of the vehicles 101, or a combination thereof. In one embodiment, the privacy settings may include identification information related to one or more users (e.g., a name, an age, one or more connections or relationships, etc. in an anonymous or non-anonymous format). It is noted that the segmentation of the road for the purposes of detecting autonomous or HAD vehicle movement can be different than the street network or road link structure of the geographic database 119. In other words, the segments can further subdivide the links of the geographic database 119 into smaller segments (e.g., of uniform lengths such as 5-meters). In this way, the routes and/or locations of the vehicles 101 can be represented at a level of granularity that is independent of the granularity or at which the actual road or road network is represented in the geographic database 119. In one embodiment, the sharing records 1309 can be associated with one or more of the node records 1303, road segment records 1305, and/or POI data records 1307; or portions thereof (e.g., smaller or different segments than indicated in the road segment records 1305, individual lanes of the road segments, etc.) to generate and/or supplement passenger profile data.

In one embodiment, the geographic database 119 can be maintained by the content provider 125 in association with the services platform 121 (e.g., a map developer). The map developer can collect geographic data to generate and enhance the geographic database 119. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

In one embodiment, the geographic database 119 include high resolution or high definition (HD) mapping data that provide centimeter-level or better accuracy of map features. For example, the geographic database 119 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 119 is stored as a hierarchical or multilevel tile-based projection or structure. More specifically, in one embodiment, the geographic database 119 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 119 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicles 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for pairing vehicles to share navigation-based content may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
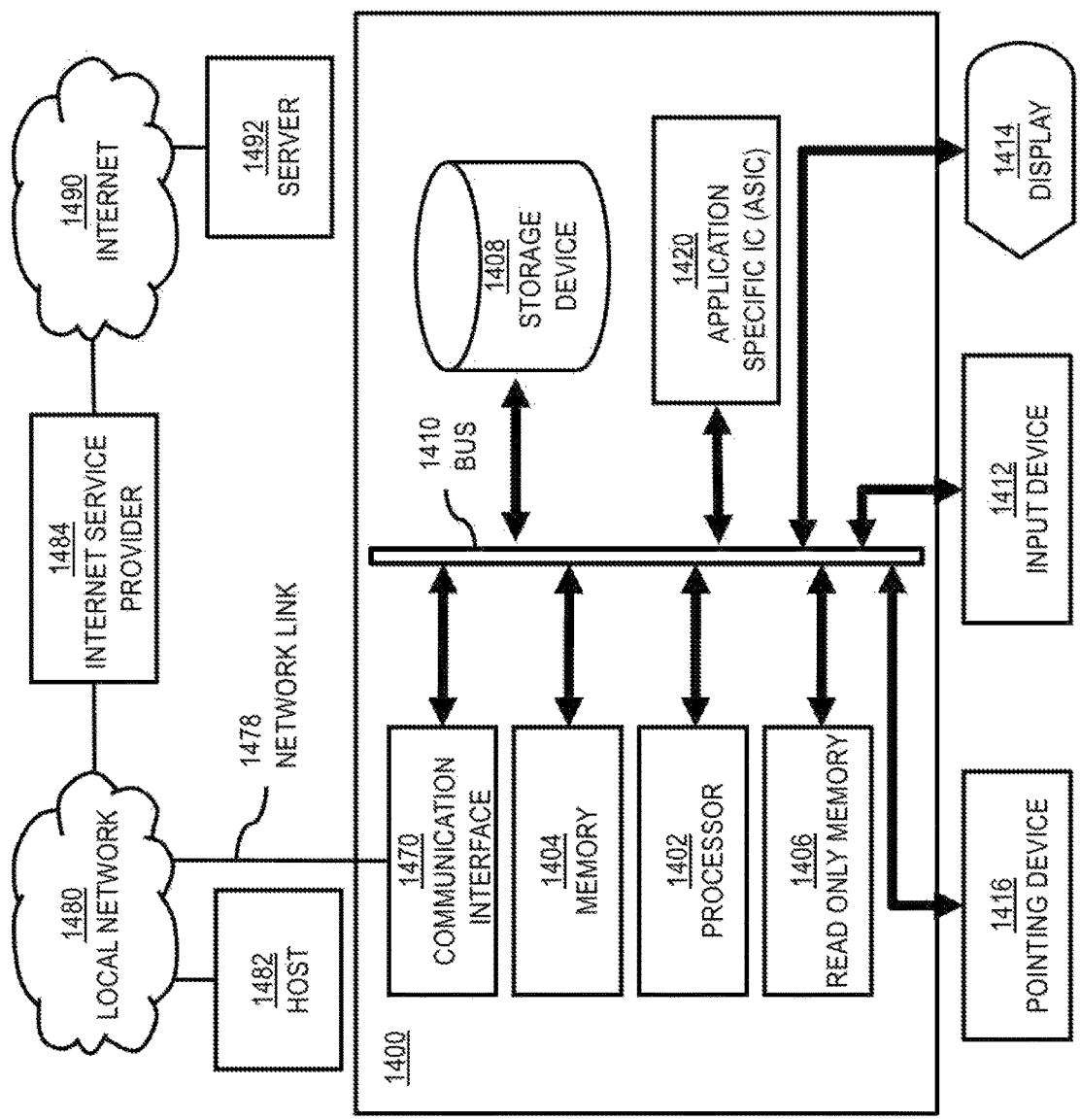
FIG. 14 is a diagram of hardware that can be used to implement an embodiment.

FIG. 14 illustrates a computer system 1400 upon which an embodiment of the invention may be implemented. Computer system 1400 is programmed (e.g., via computer program code or instructions) to pair vehicles to share navigation-based content as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1410 includes one or more parallel conductors of information so that information is transferred quickly among devices coupled to the bus 1410. One or more processors 1402 for processing information are coupled with the bus 1410.

A processor 1402 performs a set of operations on information as specified by computer program code related to pairing vehicles to share navigation-based content. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or other dynamic storage device, stores information including processor instructions for pairing vehicles to share navigation-based content. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for pairing vehicles to share navigation-based content, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT) or a liquid crystal display (LCD), or plasma screen or printer for presenting text or images, and a pointing device 1416, such as a mouse or a trackball or cursor direction keys, or motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general, the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 107 for pairing vehicles to share navigation-based content.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 15 illustrates a chip set 1500 upon which an embodiment of the invention may be implemented. Chip set 1500 is programmed to pair vehicles to share navigation-based content as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to pair vehicles to share navigation-based content. The memory 1505 also stores the data associated with or generated by the execution of the inventive steps.

FIG. 16 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile station functions that offer automatic contact matching. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile station 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603—which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile station 1601 to pair vehicles to share navigation-based content. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the station. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile station 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1651 may be, but not limited to, a single memory, CD, DVD, ROM, RAM, EEPROM, optical storage, or any other non-volatile or non-transitory storage medium capable of storing digital data.

An optionally incorporated SIM card 1649 carries, for instance, important information, such as the cellular phone number, the carrier supplying service, subscription details, and security information. The SIM card 1649 serves primarily to identify the mobile station 1601 on a radio network. The card 1649 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for privacy-sensitive sharing of navigation-based content between a first vehicle and at least one second vehicle comprising:
    initiating a pairing of the first vehicle with the at least one second vehicle, wherein the first vehicle and the at least one second vehicle have a common destination;
    determining a privacy level associated with the pairing;
    determining a granularity level for sharing the navigation-based content of the first vehicle with the at least one second vehicle based on the privacy level;
    granting an access right to the at least one second vehicle to access the navigation-based content at the determined granularity level, wherein the at least one second vehicle is guided to the common destination based on the navigation-based content of the first vehicle at the determined granularity level, and
    revoking the access right to the at least one second vehicle based on determining that the at least one second vehicle has reached the common destination.

2. The method of claim 1, further comprising:
    transmitting a pairing request to a first component of the first vehicle, a first device of a first passenger of the first vehicle, or a combination thereof from a second component of the at least one second vehicle, a second device of a second passenger of the at least one second vehicle, or a combination thereof,
    wherein the pairing is initiated based on receiving an input at the first component, the first device, or a combination thereof approving the pairing request.

3. The method of claim 2, wherein the input further specifies the privacy level associated with the pairing.

4. The method of claim 1, wherein the navigation-based content includes real-time position information of the first vehicle en route to the common destination.

5. The method of claim 1, wherein the determined granularity level shares the navigation-based content as real-time location information of the first vehicle at a reduced level of precision.

6. The method of claim 2, wherein the first passenger is among a plurality of passengers in the first vehicle, the method further comprising:
    transmitting the pairing request to a subsequent device of a subsequent passenger among the plurality of passengers based on determining that the first passenger has not responded to the pairing request within a time window.

7. The method of claim 6, further comprising:
    determining a priority order of the plurality of passengers based on one or more characteristics of the plurality of passengers,
    wherein the first passenger, the subsequent passenger, or a combination thereof is selected based on the priority order.

8. The method of claim 2, wherein the pairing request is generated by capturing an image of the first vehicle by the second device, and by processing the image to identify the first vehicle.

9. The method of claim 1, further comprising:
    receiving a pairing request from a third vehicle for another access right to follow the at least one second vehicle;
    determining a propagation rule for the access right granted to the at least one second vehicle with respect to the first vehicle; and
    granting the another access right to the third vehicle to follow the at least one second vehicle based on the propagation rule.

10. The method of claim 1, further comprising:
    determining that more than one vehicle is required to fulfil a vehicle request; and
    selecting the first vehicle, the at least one second vehicle, or a combination thereof based on one or more parameters of the vehicle request,
    wherein the one or more parameters include a pick-up location, a destination, or a combination thereof; and
    wherein the pairing is initiated based on the selecting of the first vehicle, the at least one second vehicle, or a combination thereof.

11. The method of claim 10, wherein the first vehicle, the at least one second vehicle, or a combination thereof publish a pairing preference level, and wherein the first vehicle, the at least one second vehicle, or a combination thereof are further selected based on the published pairing preference level.

12. The method of claim 1, wherein the navigation-based content can be shared using a network-connected technology or a non-network-connected technology, the method further comprising:
    selecting to use the network-connected technology or the non-network-connected technology based on a location of the first vehicle, the at least one second vehicle, or a combination thereof.

13. The method of claim 12, wherein the non-network-connected technology is used when the first vehicle, the at least one second vehicle, or a combination are within a threshold distance of a destination, and wherein the network-connected technology is used when the first vehicle, the at least one second vehicle, or a combination thereof is farther than the threshold distance from the destination.

14. An apparatus comprising:
    at least one processor; and
    at least one memory including computer program code for one or more programs,
    the at least one memory and the computer program code configured to, with the at least one processor, cause the apparatus to perform at least the following,
    initiate a pairing of a first vehicle with an at least one second vehicle;
    grant an access right to the at least one second vehicle to access destination information, location information, or a combination thereof of the first vehicle based on the pairing, wherein the destination information, the location information, or a combination thereof relates to a trip; and
    revoke the access right based on determining that the at least one second vehicle has completed the trip.

15. The apparatus of claim 14, wherein the first vehicle, the at least one second vehicle, or a combination thereof include an autonomous vehicle, an autonomous drone, an autonomous device, or a combination thereof.

16. The apparatus of claim 14, wherein the at least one second vehicle is guided by generating guidance instructions so that the at least one second vehicle reaches a destination at a target timing relative to when the first vehicle reaches the destination, and wherein the target timing includes the at least one second vehicle reaching the destination after, before, or at the same time as the first vehicle.

17. The apparatus of claim 14, wherein the apparatus is further caused to:
    transmit a pairing request to a first component of the first vehicle, a first device of a first passenger of the first vehicle, or a combination thereof from a second component of the at least one second vehicle, a second device of a second passenger of the at least one second vehicle, or a combination thereof,
wherein the pairing is initiated based on receiving an input at the first component, the first device, or a combination thereof approving the pairing request.

18. A non-transitory computer-readable storage medium carrying one or more sequences of one or more instructions which, when executed by one or more processors, cause an apparatus to perform:
   initiating a pairing of a first vehicle with an at least one second vehicle;
   granting an access right to the at least one second vehicle to access destination information, location information, or a combination thereof of the first vehicle based on the pairing, wherein the destination information, the location information, or a combination thereof relates to a trip; and
   revoking the access right based on determining that the at least one second vehicle has completed the trip.

19. The non-transitory computer-readable storage medium of claim 18, wherein the first vehicle, the at least one second vehicle, or a combination thereof are operated in an incognito mode, wherein the incognito mode causes the first vehicle, the at least one second vehicle, or a combination thereof to travel a predetermined distance, a predetermined time, or a combination thereof from the destination of the trip before transmitting current location information to a network-based component.

20. The non-transitory computer-readable storage medium of claim 19, wherein the incognito mode further causes the first vehicle, the at least one second vehicle, or a combination thereof to use one or more vehicle-based sensors to share the navigation-based content in place of sharing the navigation-based content using network-based transmissions of the navigation-based content through a network-based server.

\* \* \* \* \*